(12) United States Patent
Hsu et al.

(10) Patent No.: US 7,013,292 B1
(45) Date of Patent: Mar. 14, 2006

(54) METHOD AND SYSTEM FOR UNIVERSAL GIFT REGISTRY

(75) Inventors: Hans Hsu, Riverside, CT (US); Inte Ali, Riverside, CT (US)

(73) Assignee: Felicite.com Inc., Greenwich, CT (US)

( * ) Notice: Subject to any disclaimer, the term of this patent is extended or adjusted under 35 U.S.C. 154(b) by 0 days.

(21) Appl. No.: 09/421,108

(22) Filed: Oct. 19, 1999

Related U.S. Application Data

(60) Provisional application No. 60/138,538, filed on Jun. 10, 1999.

(51) Int. Cl.
*G06F 17/60* (2006.01)

(52) U.S. Cl. .............................. 705/37; 705/26; 705/27

(58) Field of Classification Search ................. 705/27, 705/26, 35; 70/27
See application file for complete search history.

(56) References Cited

U.S. PATENT DOCUMENTS

| | | | |
|---|---|---|---|
| 4,903,201 A | 2/1990 | Wagner | 364/408 |
| 4,980,826 A | 12/1990 | Wagner | 364/408 |
| 5,592,378 A * | 1/1997 | Cameron et al. | 705/27 |
| 5,663,547 A | 9/1997 | Ziarno | 235/380 |
| 5,665,952 A | 9/1997 | Ziarno | 235/380 |
| 5,696,366 A * | 12/1997 | Ziarno | 235/380 |
| 5,754,981 A * | 5/1998 | Veeneman et al. | 705/26 |
| 5,774,874 A | 6/1998 | Veeneman et al. | 705/26 |
| 5,794,219 A | 8/1998 | Brown | 705/37 |
| 5,839,117 A * | 11/1998 | Cameron et al. | 705/27 |
| 5,870,718 A | 2/1999 | Spector | 705/26 |
| 5,898,594 A * | 4/1999 | Leason et al. | 364/479.01 |
| 6,269,343 B1 | 7/2001 | Pallakoff | 705/26 |
| 6,598,026 B1 * | 7/2003 | Ojha et al. | 705/26 |

FOREIGN PATENT DOCUMENTS

| | | |
|---|---|---|
| WO | WO 01/02931 | 1/2001 |
| WO | WO 01/54012 | 7/2001 |

OTHER PUBLICATIONS

Freedman, Lauren, E-Commerce=Evolution or Revolution, Discount Merchandiser, Aug. 98, p130.*
Rosner, Hillary, Buying intoInteractivity, Bravdweek, Octo 1995, pp 28-34.*
Smutko, Liz et al.; Bridal Business can be Icing on the cake; . . . , Chilton's Hardware Age, v230, n11, p33(3), Nov. 1993.*
Cohen, Emily, Going to the Chapel, PC Magazine, v17, n12, p40(1), Jun. 1998.*
Byline: Business/Lifestyle Editors, UCOPIA: Ucopia Unveils New Wedding Registry Partners.., Julu 1998.*
Kopetman (Starr Rides to Freedom Bowl rescue Last-Day Scramble Secures Necessary Loans, Donations, The Los Angeles Times Jun. 28, 1986 p. 5.*
Linstedt (Shoppers Sweep into Area Stores), Buffalo News, Nov. 29, 1997.*

(Continued)

*Primary Examiner*—Jagdish N Patel
(74) *Attorney, Agent, or Firm*—Nixon & Vanderhye, PC

(57) ABSTRACT

A gift system and method enable gift givers to, among other things, each make a respective commitment for a monetary contribution of any giver-desired amount toward a gift for a gift recipient. This system and method may, for example, be implemented by providing an on-line display of gift ideas to the gift givers. This on-line display of the gift ideas reflects uncommitted balances of purchase prices for one or more of the gift ideas having the partial purchase option. When the monetary contribution from the gift givers exceed the purchase price of the gift, a purchase request is generated.

55 Claims, 17 Drawing Sheets

OTHER PUBLICATIONS

Douglass, Alexander, G. "Experience vs. Logic in Fund Raising" Fund Raising Management, v23, n4, p44(3) Jun. 1992.*
UCOPIA website, *UCOPIA breaking boundaries in wedding registry* (26 pages).
*Thinking of U Gift Giving and Reminder Service*, http://www.thinkingofu.com, printed on Jun. 4, 1999 (2 pages).
LittleBird.com Gift Registry, http://www.littlebird.com, printed on Jun. 6, 1999 (2 pages).
*Home Fleet Bridal Registry*, http://www.fleet.com, printed on Jun. 5, 1999 (2 pages).
*eWISH*, http://www.ewish.com, printed on Jun. 6, 1999 (6 pages).
*Wishworld*, http://www.wishworld.com, printed on Jun. 6, 1999 (1 page).
Wish List.com *Gift Registry Engine*, http://www.wish-list.com, printed on Jun. 5, 1999 (5 pages).
*The Wedding Gallery On-line Bridal Registry*, http://www.weddinggallery.com, printed on Jun. 5, 1999 (5 pages).
*The Wedding Registry*, http://www.dfwweddings.com, printed on Jun. 5, 1999 (1 page).
*Webistry, The Website Gift Registry*, http://www.webistry.com, printed on Feb. 2 and Jun. 5, 1999 (11 pages).
*NetGift Registry Make Gift Giving Easy*, printed from http://www.netgift.com on Aug. 5, 1999 (32 pages).
itheeweb.com, http://www.itheeweb.com, printed on Jun. 6, 1999 (1 page).
*GiftServer*, http://www.giftserver.com, printed on Jun. 6, 1999 (3 pages).
*Bride To Be Registry*, http://www.bridetoberegistry.com, printed on Jun. 5, 1999 (26 pages).
FindGift.com, http://www.findgift.com, printed on Jun. 5, 1999 (9 pages).
*ZCMI*, http://www.zcmi.com, printed on Jun. 5, 1999 (3 pages).
*Your World at Home Gift Registry*, http://www.ywh.com, printed on Jun. 5, 1999 (5 pages).
*Internet Gift Registry*, http://www.ucopia.com, printed on Jun. 6, 1999 (7 pages).
*Wedding Details Online Wedding Registry Page*, http://www.weddingdetails.com, printed on Jun. 5, 1999 (2 pages).
Wedding Channel.com, http://www.weddingchannel.com, printed on Jun. 5, 1999 (8 pages).
Wedding411.com, http://www.wedding411.com, printed on Jun. 6, 1999 (9 pages).
*Club Wedd Bridal Registry*, http://www.targetstores.com, printed on Jun. 5, 1999 (2 pages).
*Ross-Simons Bridal Registry*, http://www.ross-simons.com, printed on Jun. 5, 1999 (9 pages).
Our Dream Wedding.com, http://www.ourdreamwedding.com, printed on Jun. 6, 1999 (2 pages).
*Mail Order Bride*, http://www.mailorderbride.com, printed on Jun. 5, 1999 (6 pages).
*Macy's Bridal*, http://www.macybridal.com, printed on Jun. 6, 1999 (1 page).
*The Knot*, http://www.theknot.com, printed on Jun. 6, 1999 (8 pages).
*JC Penney Secure online Shopping*, http://www.jcpenney.com, printed on Jun. 6, 1999 (11 pages).
*Gottschalks Bridal & Gift Registry*, http://www.netcart.com, printed on Jun. 5, 1999 (3 pages).
TheGift.com, http://www.thegift.com, (5 pages).
*Della & James—the online Gift Registry*, http://www.dellajames.com, printed on Jun. 9 and Aug. 5, 1999 (12 pages).
*Bloomingdales—the registry*, http://www.bloomingdales.com, printed on Jun. 6, 1999 (3 pages).
*Bed and Bath Registry*, http://www.bedandbath.com, printed on Jun. 6, 1999 (2 pages).
*Your Registry*, http://www.yourweddingregistry.com, printed on Jun. 5, 1999 (6 pages).
*After "I Do", The Honeymoon Registry Service*, http://afterido.com, printed on Jun. 6, 1999 (10 pages).

* cited by examiner

METHOD AND SYSTEM FOR UNIVERSAL GIFT REGISTRY

This application claims the benefit of U.S. Provisional Application No. 60/138,538, filed on Jun. 10, 1999, for, UNIVERSAL GIFT REGISTRY METHOD AND SYSTEM, the content of which is incorporated herein by reference.

BACKGROUND OF THE INVENTION

1. Field of the Invention

This invention relates to the field of data processing in a business transaction and more particularly to a gift registry system and method.

2. Background Information

Gift registries are known and used in a number of different markets, with the most common area being wedding registries. Typically, these registries are provided by a large store or establishment, with a number of different departments in the store. When the store has multiple locations, it is also known to provide some form of link (electronic or otherwise) between the stores so that a gift recipient (the registrant) can register in one store and gift givers can review items on the registry and make purchases at another store.

When the registry spans a number of different locations, the method and technique for maintaining information on items purchased from the registry and remaining unpurchased is often not well managed. Accordingly, it is possible that different people purchase the same item for a recipient from different locations on the same day and the problem is not discovered until a registry update is performed at the end of the day or week. It is common for the department store to maintain the registry in a book in the store where the recipient registers and periodically update that book when gifts are purchased. Accordingly, recipients and gift givers are better served when registry information is updated automatically and in near-real-time.

Traditional store or establishment based gift registries seldom provide discounted prices. In fact, the ability to charge gift givers retail prices for items that are commonly discounted is often cited as an attractive feature of the gift registry business. (see for example, pg. 37, The Knot Inc., S-1, Sep. 9,1999, "Because items are selected by the engaged couple but paid for by their guests, price sensitivity is minimal and registry products are rarely discounted by retailers.") Accordingly, recipients and gift givers are better served when registries provide access to discounted prices or special sales.

Traditional store or establishment based gift registries seldom provide out-of-season access to seasonal products. Recipients may add a seasonal item to their registry (e.g., barbecue sets, skis, patio furniture) however, these items may no longer be in stock when gift givers attempt to purchase them. Accordingly, recipients and gift givers are better served when registries provide access to seasonal items without regard to season.

Traditional store or establishment based gift registries have a significant gift return volume, with the associated return expense. In fact, in traditional registries, a major expense is the cost of handling returns. To manage this expense, registries frequently impose restrictive return policies. Registrants return gifts for many reasons. Some have received duplicate gifts either within the registry or outside of the registry. Others may have changed their minds and want a different pattern or model. Still others may simply wish to do their own shopping, perhaps on-line at an auction site, or postpone their purchase, and therefore wish to convert the gift to cash. Sometimes recipients know before a gift is ordered or shipped, that they wish to return it. However, a traditional registry does not provide a means to return a gift before it is ordered or sent, and often have restrictive return policies for gifts that have been sent. Even when stores have relaxed return policies, the recipient must still locate the receipt, and physically transport the gift, or arrange shipping, to the store at considerable cost and inconvenience. Therefore, both gift registries and recipients want to avoid the expense involved in returning a gift. Gift givers want to minimize inconvenience to the recipient and give a gift that can be conveniently returned by the recipient and exchanged for something they really want. Accordingly, all parties are better served when the gift return process can be made more convenient and efficient.

Traditional store or establishment based gift registries require that a gift giver purchase an entire gift, not part of a gift. For example, a gift giver may purchase one fork, or one plate, or one platter. However, the gift giver is unable to purchase part of platter, or contribute to the purchase of a plate. As an example, in a traditional registry, the giver can't contribute $250.00 toward purchase of a $4985.00 computer. The gift giver may also have a certain budget ceiling for a gift and will only purchase gifts that are equal to or less than that ceiling. Because they are not able to purchase part of a gift, they select a gift from the registry that has a cost less than their ceiling. The difference between the cost of the gift and the giver's gift cost ceiling is never spent. Accordingly, recipients and gift givers are better served when a registry allows multiple givers to make partial contributions toward a gift purchase.

Traditional store or establishment based gift registries are unable to handle gifts that are not available within their establishment. A recipient who wants both a computer and silverware must generally register with two different stores. Having to register at multiple registries creates problems for both the recipient and the gift giver. The recipient would prefer to avoid the inconvenience and cost of having to visit, establish and maintain multiple registries. The gift giver is also less inclined to visit multiple establishments in an attempt to purchase a gift on the registry. Accordingly, recipients and gift givers are better served when a single registry accommodates all of the recipient's desired gifts.

Traditional gift registries are also unable to handle gifts for which a value can be calculated, but which are not generally available from stores. For example, "a lifetime subscription to Sports Illustrated", "movie tickets to episode 3 of Star Wars", or "ice cream at the Eiffel Tower on a summer afternoon". However, recipients may wish to receive such gifts in their registry, and gift givers may wish to purchase such gifts for recipients. Accordingly, both recipients and gift givers are better served when such gifts may be registered and purchased from a gift registry.

Traditional store or establishment based gift registries do not allow a simple cash gift. A recipient may prefer a cash gift so they can make a donation to a favorite charity, make a down-payment on a house, defer their purchase of material goods until they have chosen a place to settle, or purchase a particular gift on their own from an on-line auction site or outlet mall. A gift giver may be willing to give a cash gift, but wants the recipient to benefit from the data processing capabilities of the registry, is uncertain as to the exact amount required, or wants to know the purpose of the cash gift. Accordingly, recipients and gift givers are better served when cash is an available option for a gift.

Traditional store or establishment based gift registries do not allow gift substitutions. A recipient may identify a particular gift in the registry, but be interested in other gifts if that gift is not available or is replaced by a more advanced model. Those other gifts could be related to the identified gift (different make/model/price). Alternatively, the other gifts could be very different from the identified gift (cash instead of the good or service). The gift giver may be willing to give alternative, or substitute gifts, but feel uncomfortable identifying a range of different gifts if the prices are not all the same. The gift registry may be interested in providing a good or service even if it is a substitute gift, rather than simply brokering a cash gift. Accordingly, all parties to the gift registry are better served when options for gift substitutions are provided.

Systems and methods to provide distributed access to a gift registry are needed. Systems and methods to provide registry of diverse goods and services, including items that are not traditionally considered for gifts are needed. Systems and methods to provide real-time updates to the gift registry are needed. Systems and methods to reduce the incidence of duplicate gifts are needed. Systems and methods to provide an opportunity for gift givers to make a partial contribution or partial purchase of an item on a gift registry are needed. Systems and methods to allow recipients to register all their gifts in one location instead of multiple gift registries are needed. Systems and methods to allow a recipient to receive cash instead of a good or service are needed. Systems and methods to reduce or eliminate the cost of gift returns are needed. Systems and methods to allow a recipient to automatically convert the gift to cash without the expense of the traditional return process are needed. Systems and methods to allow a recipient to set a gift amount for a gift idea are needed. These and other disadvantages of the existing systems are addressed by the instant invention.

SUMMARY OF THE INVENTION

In one aspect, the invention provides a method and system for receiving a purchase request for a gift from a gift giver with an associated purchase amount. The system determines whether to satisfy the purchase request with a purchase or a gift substitution option.

In one aspect, the invention provides a method and system for receiving a first purchase request with an associated first purchase amount from a first gift giver, and receiving a second purchase request with an associated purchase amount from a second gift giver. The first and second purchase amounts are aggregated to satisfy the first or second purchase request.

In one aspect, the invention provides a method and system for receiving a gift idea with an associated gift amount from a gift recipient and receiving a commitment from a gift giver to a purchase request in an amount that is less than the gift amount. The commitment of the gift giver serving as a partial satisfaction of the gift amount.

In one aspect, the invention provides a method and system for receiving a purchase request for a gift from a gift giver. The system determines whether to satisfy the purchase request with a purchase or a gift substitution option.

In one aspect, the invention provides a method and system for receiving a gift purchase request for a gift from a gift giver with an associated purchase amount. The system provides the purchase request to vendors, or makes the purchase request available to vendors using a remote access system. The purchase request includes a firm offer with an associated offer amount.

In one aspect, the invention provides a method and system for receiving a gift idea from a gift recipient and receiving a gift amount which is determined by the recipient and is associated with the gift idea.

In each of the above aspects, alternatives are provided where the gift substitution option includes cash as a gift, and coupons may be included with the cash or the gift. Multiple gift givers may contribute to the purchase amounts toward the purchase request. An on-line system provides one of the methods and systems, and provides access to multiple vendors. The vendors products and services provide gift ideas for the recipient, with associated sales prices. Both established vendors and ad-hoc vendors participate and various vendor contact techniques are provided, including parallel contact, serial contact and auctions.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWING

The foregoing features and other aspects of the invention are explained in the following description taken in conjunction with the accompanying figures wherein.

Figure 1:
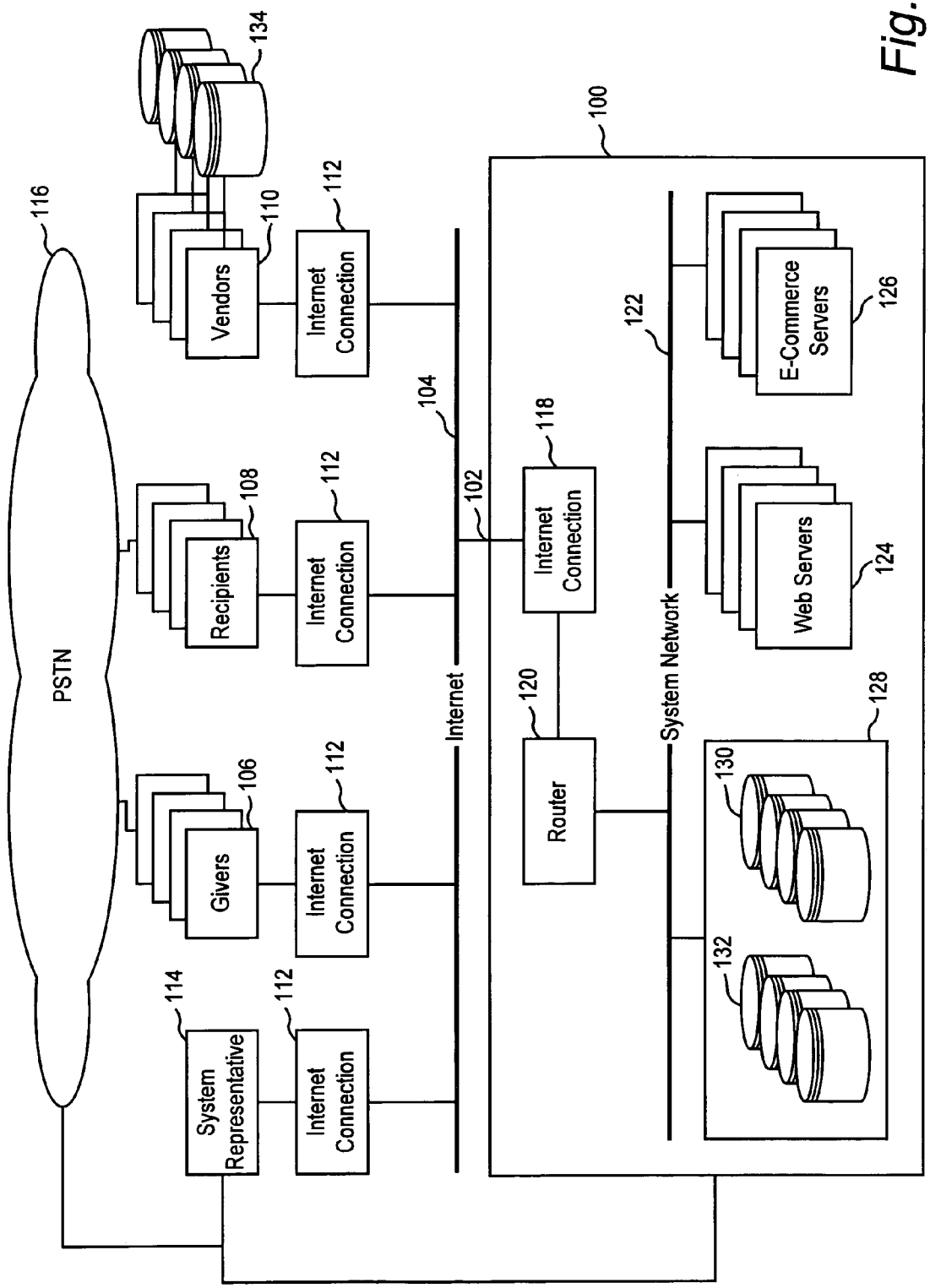
FIG. 1 illustrates an embodiment of the system of the instant invention.

It is understood that the drawings are for illustration only and are not limiting.

DETAILED DESCRIPTION OF THE INVENTION

Terminology

A short summary of certain terms is provided here, to reduce some of the potential questions with regard to those terms, as they are used in the specification and claims. It is to be understood that this summary is provided to assist the reader with understanding how the terms relate to each other, but the summary does not restrict the meaning of the terms. The figures and specification more fully establish the meaning for the terms.

gift—cash, goods or services, that can be received by a recipient. The gift may be anonymous. When the gift is other than cash, the registry purchases or arranges purchase and provides the gift to the recipient using funds provided by the giver. The registry may provide the gift to the recipient, or the registry may provide the gift to the giver, who arranges delivery to the recipient.

gift idea—a specific gift suggestion that is listed within a gift registry to assist givers with a gift. The recipient provides or identifies gift ideas when they register. Alternatively, others, including friends and relatives of the recipient, may provide the gift ideas. Gift ideas are typically selected from a range of products or services that are available from established vendors. However, there is no requirement that the gift idea be available from an established vendor. This allows ad-hoc vendors to participate in the system. This also allows recipients to designate gift ideas from vendors who might not normally be associated with a gift registry.

gift amount—a specific cost or amount that is associated with a particular gift idea. Just as the gift idea is normally provided by the recipient, so is the gift amount. The gift amount is typically the same as or related to the retail cost of the associated gift idea from an established vendor. However, it is possible that the gift amount is different from the retail cost of the gift idea. This difference in cost may be more or less than the retail cost. Within known gift registries, the gift amount is generally the retail cost of the gift idea. The concept of having a recipient include a gift amount within the gift registry and allowing that gift amount to be different from the retail cost of the gift idea is one aspect of the invention.

giver—a person, party or organization intending to provide the gift to the recipient. A giver is a user of the instant invention.

recipient—a person, party or organization that receives the gift from the giver. A recipient is a user of the instant invention.

coupon—something that accompanies a gift, a gift substitute, or cash in a cash option. The coupon normally represents an opportunity to receive some good or service at a reduced price or under special circumstances. Use of a coupon in a gift registry, such as with a gift, a gift substitute or cash option is one aspect of the instant invention.

token—an item, other than the gift, which may be provided to the giver. The token may be as simple as a card including the giver's identification and associated gift that will be provided. Typically, the token serves as a representative of the gift, but is not an independent gift. A token in a gift registry is one aspect of the instant invention.

established vendor—a vendor that has a pre-established relationship with the registry. Typically, the established vendor has provided a list of items that may serve as gift ideas, with associated costs. The established vendor may provide this list directly, or may provide access to their own database, such as through the Internet, to allow users of the system to browse and/or select gifts or gift ideas. An established vendor is a user of the inventive system.

ad-hoc vendor—a vendor that does not have a pre-established relationship with the registry. Typically, when the system contacts an ad-hoc vendor regarding a gift idea or purchase request, the ad-hoc vendor will then become a user of the inventive system. An ad-hoc vendor relationship is one aspect of the instant invention.

purchase request—provided by the giver to the system indicating that the giver desires to purchase a gift. A purchase request corresponds to a gift idea. Recipients identify gift ideas to the system, givers provide a purchase request to the system for the gift idea. The purchase request has an associated purchase amount that is also provided to the system by the giver. The purchase request typically identifies a gift idea that is listed in the registry. The purchase request may be absolute, or conditional. A conditional purchase request is typically a commitment to the purchase request, if some other event occurs or fails to occur. An example is with partial satisfaction of the purchase amount for the purchase request, where if another giver fails to make a commitment to fund the remaining balance, the giver may withdraw their commitment to that purchase request and associated purchase amount.

purchase amount—a financial value, such as a dollar amount, that is associated with a purchase request. The giver provides the purchase amount to the system in association with the purchase request. Just as the purchase request correlates to a gift idea, the purchase amount correlates to the gift amount. If the purchase amount is less than the gift amount, the gift is normally considered to be a commitment or partial satisfaction of the purchase amount. If the purchase amount is more than the gift amount, the system will normally provide the excess as a cash option. A system that can accommodate a purchase amount that is different from the gift amount is one aspect of the instant invention.

gift substitution option—a substitute gift. The gift substitution option is a particular type of transaction that is one aspect of the invention.

cash option—a gift in cash, rather than a good or service. The cash option is a particular type of transaction that is one aspect of the invention.

contingent substitution—a substitution that occurs as a result of certain conditions. The contingent substitution is a particular type of transaction that is one aspect of the invention.

mandatory substitution—a substitution that occurs regardless of certain conditions. The mandatory substitution is a particular type of transaction that is one aspect of the invention.

partial satisfaction—a purchase amount or a commitment to a purchase amount that is less than the full gift amount. Partial satisfaction is a particular type of transaction that is one aspect of the invention.

commitment—an assurance from a giver that they will provide a purchase amount toward a purchase request of a gift idea. Typically, a giver makes a commitment when they are providing only a partial contribution toward the full cost of the gift idea. The systems uses the commitment from one giver to inform other givers that they can also contribute to the full cost of the gift idea. This information thereby allows other givers to also provide partial satisfaction of the full cost of that gift idea. A commitment is a particular type of transaction that is one aspect of the invention.

The preceding summary is not intended to be the only source of definition for the terms. The specification, drawings and claims provide further explanation and examples.

The present invention provides a number of unique advantages for givers and recipients. In one embodiment of the invention, gift recipients register multiple gift ideas with a gift registry. These multiple gift ideas each include an associated gift amount to assist a prospective gift giver in their selection of an appropriate gift from the list of gift ideas. The system includes information from gift vendors to assist the recipient and the giver in their selections.

In a preferred embodiment, the gift registry is an on-line system, though many of the concepts are adaptable to a conventional gift registry. In the preferred embodiment, the on-line system links multiple interactive sites using a variety of technologies to provide a wide-area system. This interconnection allows givers and recipients to access the on-line system through access means that include wired and wireless computer connections; voice and data telecommunications connections; in-store systems; in-locale systems; and kiosk systems.

When a gift giver selects a gift using the system, they submit a purchase request for the gift with an associated purchase amount. Typically, the purchase amount is the same as the gift amount. However, in one embodiment, the giver may not be able to provide the full gift amount. Accordingly, their purchase amount may be less than the gift amount. The system is able to accommodate this less than full satisfaction of the purchase amount in a number of different ways.

It is also possible that when the recipient selects a gift idea and associated gift amount, they identify a gift amount that is less than the amount that established vendors have indicated they will sell the item. The recipient may have a number of reasons for identifying a gift amount that is less than the established price of the item. The recipient may know of a source for the item where the cost is less than established merchants, and is willing to purchase the gift themselves if they receive cash in that amount rather than the gift itself. Alternatively, the recipient may be unaware of an established cost of the gift idea, or the purchase price for the gift idea may increase. For these circumstances, and others, the system provides the gift substitution option and the cash option. With these options, the system accepts the giver's purchase request and associated purchase amount. If the system is unable to satisfy the purchase request at the purchase amount, the recipient is provided an opportunity to receive a substitute gift, or cash in the amount of the purchase amount. This allows the giver to select a gift at the purchase amount, and allows the recipient to receive the gift, a substitute gift or purchase the gift using the cash from the cash option. These elements of the invention are described in greater detail below.

Referring to FIG. 1, an embodiment of system 100 of the present invention includes a remote access on-line communication port 102, which provides remote access means for users, such as gift givers 106, gift recipients 108, and vendors 110. In the embodiment illustrated in the figures, the remote access is an on-line access via the Internet 104. However, it is understood that any form of access that provides the capability for individuals to interact with the system is appropriate for the instant invention.

The various users 106, 108, 110 connect to the Internet 104 using any of the known types of Internet access 112, including dial-up line, modem, wired connection, wireless connection, broad-band cable, fiber optic, public switched telephone network (PSTN), wide area network, and local area network. As indicated, the type of connection is not unique to the invention and it is envisioned that these and new types of connection will be available to users.

In the event that direct user access to system 100 using the Internet is not appropriate or desired, it is also possible that users 106, 108, 110 contact a representative 114 of system 100 using known forms of contact. These forms of contact 116 include wired and wireless telephony using private and public networks, such as the PSTN.

System 100 also includes an access 118 to the Internet 104. However, system 100 requires greater access bandwidth to the Internet than individual users, given the greater demands of multiple users. Accordingly, it may be appropriate for access 118 to provide higher bandwidth at T-1 or T-3 megabit rates as compared to lower bandwidth rates of user access 112, which may be in the 50–100 kilobit rate. Regardless, the interconnection of users 106, 108, 110 and system 100 will depend on many factors. Within the scope of the instant invention, the interconnection bandwidth can affect the quality and timeliness of the access, but it does not affect the overall invention.

Within system 100, a number of elements provide information storage and access. A router or routers 120 provides a connection between the system network 122 and the remote access network or internet 104. System network 122 provides a broadband highspeed data and communication bus for individual elements of system 100. Servers 124, 126, which are linked to system network 122, serve as the processing backbone of system 100. The software source code for system 100, as well as the interface to the system provided by these servers. Servers 124 and 126 are any of the known and envisioned types of computer hardware/software. They include processors, memory, input/output devices, and other assorted and known peripherals. Typically, servers 124, 126 are general purpose computer processors that are customized by the software that is written, compiled and loaded into their memories through some form of storage medium. However, as the state of art changes, servers 124, 126 may become more specialized, or may assume qualities that are not presently known.

In one embodiment, one group of web servers 124 that are powered by an application servers/services (examples include COLD FUSION, servlets, and ASP) supports the interactive media of the system. This includes the HTML code and underlying databases required for the web site, as well as the server administration required for the site.

Another group of web servers 126 provide the financial or electronic commerce support for system 100. These servers include encryption or protection functions to rapidly and securely process user transactions. Servers 126 also support the required financial tracking and audit for system 100.

A group of data storage devices 128 are also interconnected to system network 122. These data storage devices provide storage as information repositories, and very little independent processing of information. In the embodiment of FIG. 1, data storage devices or servers 128 include SQL databases with various information. One set of information includes supplier or vendor data 130. Another set of information includes system data 132. System data 132 includes data from individual users 106, 108, 110, as well as data required by system 100. In the embodiment of FIG. 1, the information in the supplier or vendor database 130 is provided by established vendors 110. However, it may be appropriate that the information in database 130 is not maintained within system 100, but is instead available on distributed databases 134 that are available through the multiple vendor locations.

In the embodiment of FIG. 1, users 106, 108, 110 remotely access system 100 using the Internet. In another embodiment, system 100 is located in a centralized location, such as at a shopping mall, or a department store. In this embodiment, users access system 100 with an input terminal at the centralized location. System 100 has connections to other terminals at other centralized locations. In this embodiment a recipient in one city can identify gift ideas and gift amounts, while gift givers in other cities can access the system to make purchase requests with corresponding purchase amounts. While it is possible to implement embodiments of system 100 within a single commercial establishment, the benefits are more fully realized when multiple vendors 110 are users of the system. The advantage of multiple vendors and more than a single establishment will be more apparent as the system is more fully described.

Recipient Registration

Figure 2:
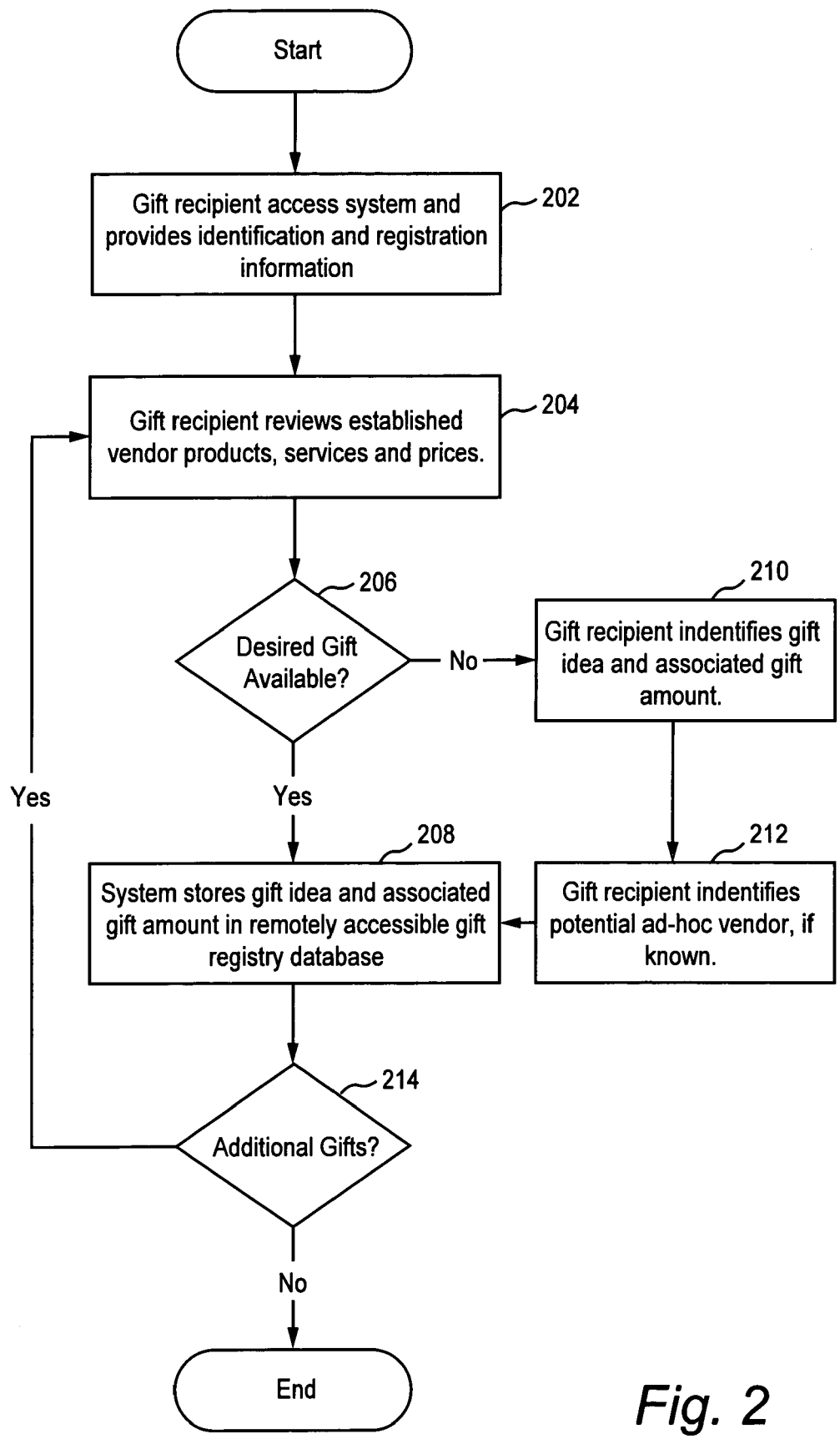
FIG. 2 illustrates an embodiment of the steps for gift recipient registration in the instant invention.

Referring to FIGS. 1 and 2, in one embodiment, at step 202, a prospective gift recipient 108 accesses system 100 through some form of remote on-line access, such as through the Internet 104 via their internet connection 112. In this embodiment, access is through a browser application, such as NETSCAPE or INTERNET EXPLORER, that is running on the user's computer, WEBTV or wireless device.

Once connected to system 100, the recipient provides identifying information regarding themselves and the circumstances surrounding their registration. For example, the system solicits the recipient's name, address, age and any personal likes or dislikes. System 100 uses some of this information for gift delivery and other information for marketing purposes. Some, though not all recipient information is also available to other users of system 100, including potential givers and vendors. System 100 also solicits the circumstances surrounding the gift registration. This includes the type of event (wedding, birthday, bar mitzvah, graduation, etc.) as well as information relating to the event (date, time, location, honeymoon location, indoor or outdoor party, etc.). This information, which is solicited from the recipient, becomes part of that recipient's data record that is maintained in database 132 of server 128. Normally, the recipient provides the requested information, but friends or relatives can also provide the information, such as for a child or for a surprise party.

At step 204, after the recipient provides the requested information, they are provided access to possible gift ideas, and gift amounts from established vendors 110. System 100 may pre-screen or prioritize vendors based on recipient information. For example, vendors with products or services that are commonly associated with a wedding may receive a high priority display if the event is a wedding, but will have a lower priority display if the event is a child's birthday.

Information on the products and services that are available from vendor 110 is either maintained in data records on database 130 of server 128, or is maintained in data records on database 134 available through the vendor location. However, because system 100 has access to either database, the actual location of the information is transparent to recipient 108.

Recipient 108 reviews the products and services available from established vendors 10 and the associated costs for those products and services, as provided by the vendor. The cost associated with the products and services is normally the vendor's retail price for that product or service. In this regard, system 100 performs functions that are similar to a traditional in-store gift registry, where information related to the recipient is collected by personnel at the store, along with information on the event. That information is used to assist the recipient with selection of gift ideas. However, in a traditional store registry, the collected information may not be available to givers, or other vendors. Additional, in a traditional in-store registry, the recipient does not have an opportunity to select from multiple vendors.

Where the gift idea is available from an established vendor, system 100 provides the associated cost of that gift idea to the recipient, to assist the recipient with selecting a gift amount associated with the gift idea. Assuming that the vendor supplied cost is current and the product or service is available, when the recipient selects that vendor supplied cost as the gift amount associated with the gift idea, there is a reasonable probability that a giver can purchase that gift idea for the associated gift amount.

At step 206, the recipient determines whether the gift idea and cost from established vendors is desired. The instant invention also allows the recipient to provide a gift amount that is different from the vendor supplied cost. For example, if the recipient has determined that the gift idea is available from another source, such as a discount house, there is a possibility that the gift idea is available for less than the cost supplied by established vendor 110. In this example, the discount house is not an established vendor of system 100 and therefore their products and services, with associated costs, are not available to recipients and givers through system 100. In another example, the gift idea may not be available from any of the established vendors and recipient 108 does not know the actual cost of the gift idea. In this case, the gift amount may be the recipient's best guess of the cost to purchase the gift idea. In another example, the recipient may know the cost to purchase the gift idea through an established vendor and also through other vendors, and still assigns a gift amount that is less than the cost of the gift idea from any of the known vendors. In this case, the recipient is hoping that system 100 will be able to locate the gift idea for less than the known costs. Or, the recipient deciding that they prefer cash to the gift, sets an artificially low gift amount, knowing that the gift is unavailable for that gift amount. In this manner, the recipient can predispose that gift to the gift substitution option or cash option, rather than the gift itself.

At step 210, if the recipient determines that the established vendors are not able to provide the desired gift idea at the desired gift amount, the recipient provides the desired gift and associated gift amount.

At step 212, if the recipient also knows of a vendor, that is not established with system 100, that vendor information is provided to system 100.

At step 208, the information regarding the desired gift idea and desired gift amount is stored in a database of server 128, with vendor information if available. The recipient also indicates whether this gift idea is subject to the gift substitution option or cash option, and stores that information in the database of server 128. The gift substitution option and cash option is described below in greater detail.

At step 214, system 100 determines whether the recipient wants to identify additional gift ideas, looping to step 204 if there are additional gift ideas, otherwise ending the registration process.

In FIGS. 1 and 2, the concept of a gift amount associated with a gift idea in the instant invention is illustrated and described within the context of an on-line or remote access gift registry system. This concept is also appropriate for a traditional gift registry. However, a traditional gift registry may be disinclined to implement this concept as their profit source and motive is unclear. The gift substitution option, cash option and coupons, described below, help provide an incentive for this concept, even in a traditional gift registry.

Giver Access and Gift Selection

Figure 3:
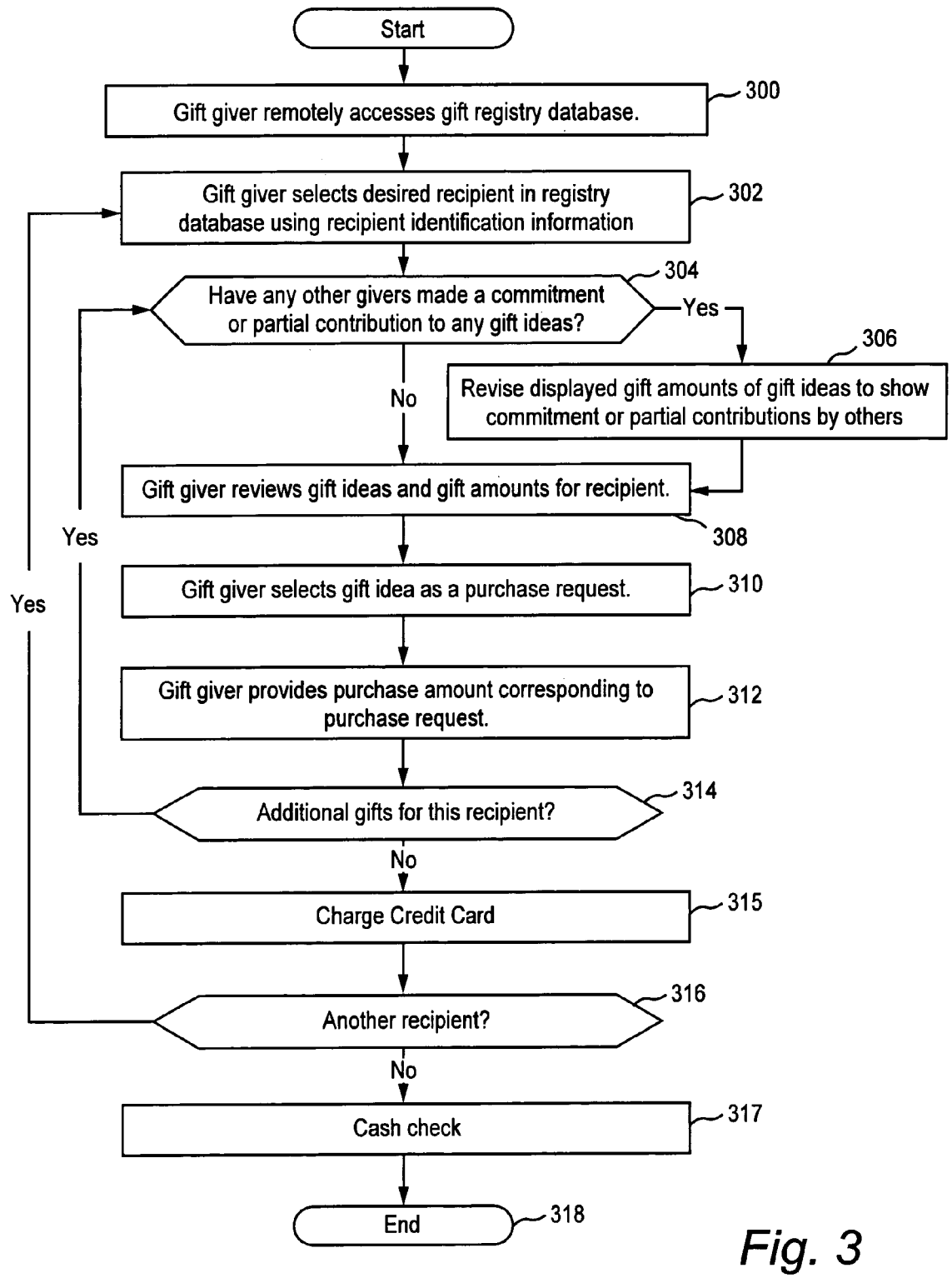
FIG. 3 illustrates an embodiment of the steps for gift giver access and selection of a gift in the instant invention.

Referring to FIGS. 1 and 3, at step 300, a gift giver 106 who is a user of system 100 similarly accesses system 100 with some form of remote on-line access, such as through the Internet 104 via their internet connection 112. In this embodiment, the access of gift giver 106 is through a browser application, such as NETSCAPE or INTERNET EXPLORER, that is running on the user's computer, WEBTV or wireless device.

At step 302, once connected to system 100, the gift giver provides identifying information regarding the recipient so as to access the gift ideas of that recipient and learn more about the circumstances surrounding the recipient's gift registration. For example, recipient 108 may provide a password or event name to the gift givers, when they provide an invitation to a wedding. It is also envisioned that a URL for the recipient registry page will be sent by e-mail to gift givers. The e-mail also includes any password or information required to access the web page. This allows the gift giver to properly identify the correct recipient and access the gift ideas and gift amounts. Gift giver 106 also provides some identifying information about themselves, as well as payment information for gift purchases. System 100 uses some of this information for gift payment and delivery and other information for marketing purposes.

At step 304, system 100 determines from on-line database servers 128 whether any of the gift ideas of the recipient have a commitment or partial satisfaction. If there are any commitments or partial satisfactions, at step 306, system 100 updates the information for display so that all information regarding gift ideas and gift amounts is current.

At step 308, the gift giver reviews the gift ideas and associated gift amounts for the desired recipient.

At step 310, the gift giver selects a gift idea and makes a purchase request to system 100 for the gift idea.

At step 312, the gift giver provides a purchase amount to system 100 corresponding to the purchase request. The purchase amount may be the same as the uncommitted balance of the gift amount (with consideration for commitments by other gift givers and partial satisfaction), or the purchase amount may be less than the gift amount.

At step 314, system 100 determines whether the gift giver wants to select other gifts for this recipient, and if so, loops to step 304.

At step 315, system 100 determines whether the gift giver will pay with a credit card, and if so charges the card.

At step 316, system 100 determines whether the gift giver wants to review gift ideas of another recipient, and if so loops to step 302.

At step 317, system 100 determines whether the gift giver will pay with a check, and if so cashes the check at step 317. At step 317, system 100 may wait for an actual check or may arrange for electronic presentment of a check drawn on the gift giver's account.

At step 318, gift giver 106 disconnects from system 100.

Though not illustrated in FIG. 3, there are additional steps related to payment processing that system 100 performs with the gift giver before the giver disconnects from the system. For example, credit card or electronic payment is provided by system 100 using known types of transaction processing systems. Encryption or protection for the sensitive aspects of the transaction are also provided by system 100.

Partial Satisfaction One problem with a traditional gift registry is that a giver has essentially only two choices for a particular gift. The giver either purchases the entire gift, or does not purchase the gift. This is because there is no easy process for a giver to purchase part of a gift, or contribute to the purchase of a gift. This can be particularly problematic when the giver arrives late to the registry. The lower cost gift ideas are typically gone and the only remaining gift ideas are the computer for $3995.00, or the crystal punch bowl for $2485.00. Faced with these choices, the giver, who isn't interested in spending that much on a gift, purchases the proverbial toaster outside the registry. The recipient, who already has a toaster, must return it. It is very probable that the recipient would prefer that the giver make a contribution to one of the items on the registry, rather than make a purchase outside the registry.

With a partial purchase option, the giver can make a commitment for part of the gift amount. The registry records that partial purchase against the gift idea so that other givers, can assist with the purchase. When enough givers make commitments, the gift can be purchased. If enough givers are not committed, the recipient can receive the cash instead and make up the balance, or do something else with the cash.

For example, if the recipient registered a $2000 computer system, a giver can come in and contribute $100 toward its purchase. This is useful as it permits several of the recipient's friends to each pay for a part of an expensive gift without having to get together ahead of time to discuss how much each is paying. Each person can simply pay as much as they are comfortable with.

Figure 4:
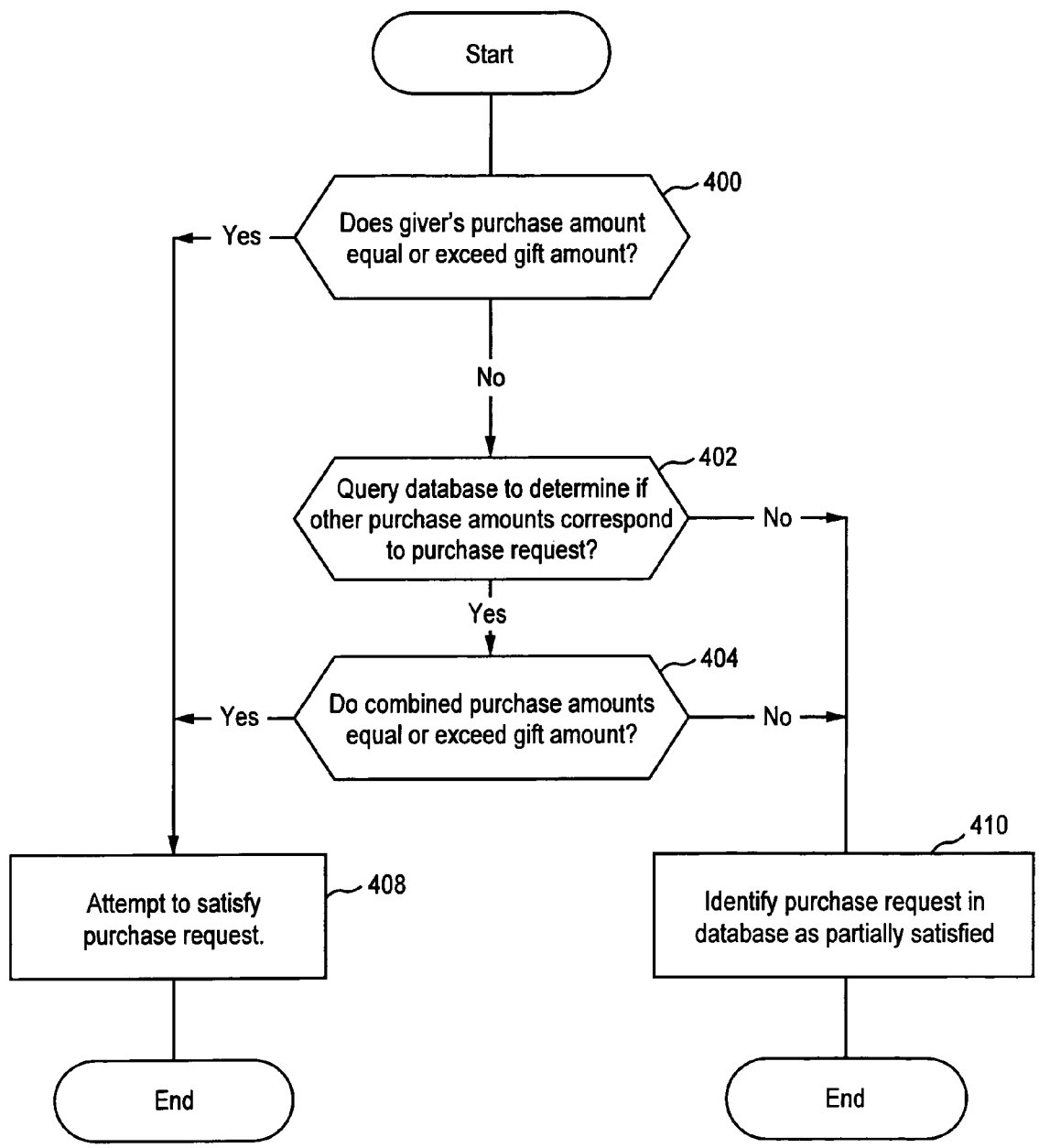
FIG. 4 illustrates an embodiment of steps relating to partial payment or satisfaction of a purchase request in the instant invention.

Referring to FIGS. 1 and 4, after a gift giver has selected a gift idea and made a purchase request with an associated purchase amount, at step 400, system 100 determines whether the purchase amount is equal to or greater than the gift amount. If so, there are sufficient funds to attempt to satisfy the purchase request at step 408.

If the purchase amount is less than the gift amount, then at step 402, system 100 determines whether other gift givers have made a commitment or partial satisfaction for that gift idea.

If other gift givers have made a commitment or partial satisfaction, then at step 404, system 100 determines whether the combination of those amounts are sufficient to equal or exceed the gift amount. If so, system 100 attempts to satisfy the purchase request at step 408.

If the combined amounts are not sufficient to equal or exceed the gift amount, then at step 410, system 100 identifies the purchase request in the database of server 128 as partially satisfied.

The partial purchase concept can be combined with the gift substitution option and cash option described below. For example, a giver, who wants to commit to part of a gift, will know that if other givers do not make commitments for that particular gift, the recipient will alternatively get a substitute gift or cash in the amount of their commitment.

Alternatively, the giver can specify that their commitment to the purchase request with a partial purchase amount is good only so long as other givers make commitments sufficient to meet the full purchase amount and thereby satisfy the purchase request. If other givers do not make the necessary commitments within a period of time, the giver can withdraw their commitment.

Partial purchase is adaptable to conventional gift registries, if the underlying databases supporting the registry are suitably adapted. One requirement for providing partial purchase is that the database must be updated and maintained more frequently than once a day. If the gift registry is maintained by a single establishment or vendor, and giver's commitments are recorded with the registry when made, the database is always current and partial purchase is easily accommodated. However, if the gift registry is distributed across multiple locations of the establishment, the database must be updated as actions occur, rather than batch processing at the end of the day.

Gift Substitution Option, Cash Option and Name Your Own Gift Amount

In a traditional gift registry, such as a wedding registry, a prospective gift recipient registers with one or more commercial establishments. When the registration is with a single establishment, there are normally multiple departments within the establishment. This allows the recipient to select or identify gifts from the different areas, at different prices. Thus, china, silver, sheets, linens, kitchen ware, bath ware and other assorted gift ideas can be selected. When the gift registration is with multiple co-located establishments, such at in a shopping mall, the gift recipient can register at one store in the mall for china, another store in the mall for intimate apparel, another store for sporting goods, etc.

However, this recipient may know that the gift ideas they select at the establishment are priced at retail, and that the same items are available from a discount establishment at a savings. Therefore, the gift recipient, knowing that the same gift is available at a lower price has a dilemma. If they register with the retail establishment, the giver will be able to take advantage of the centralized gift registry, but will have to pay more for the gift than it could be purchased for at a discount establishment. However, if the gift recipient does not register this gift, gift givers would have no way of knowing that this gift is wanted. Some gift recipients will register the gift at the higher price, and then attempt to return it, taking the cash and buying the same gift at the lower price. This is inconvenient for the recipient. Moreover, some stores have sought to prevent this practice by implementing restrictive return policies.

The gift substitution option, cash option and name your own gift amount concepts help to solve the dilemma. A recipient identifies the gift idea with the registry. However, rather than merely identifying the gift idea, the recipient also provides an associated gift amount for the gift idea. In a traditional gift registry, the gift amount would be the same as the cost of the gift idea at the registry. However the invention allows the gift amount to be something other than the retail cost at the traditional registry. Without the invention, in a traditional gift registry, the retail establishment is unable to provide the gift at the gift amount without discounting the item. Since discounting outside planned sales events is something most registries are not inclined to do, the concept would normally fail.

With the gift substitution option, cash option and name your own gift amount, when the establishment is willing to broker the transaction between the giver and the recipient, all parties can gain the advantage of a centralized gift registry. The recipient can register gift ideas in a centralized location and thereby avoid the problem of multiple undesired gifts. The recipient can also reduce the gift cost for the giver. The giver can determine which gift ideas are desired by the recipient and know that they are not buying a duplicate gift that will be returned. The giver also receives the advantage of a lower cost for the gift.

However, without some incentive the registry gains little from the cash option. The registry profit that normally helps to offset the cost of establishing and maintaining the registry, is not available without purchase of a gift. At least for this reason, traditional gift registries are not inclined to support a cash option.

A problem for a cash option in a traditional gift registry is that the registry provides the gift amount to the recipient as cash, rather than selling the gift. Unless the registry takes a percentage of the gift amount as a fee, there must be some form of incentive for the registry to implement a cash option. In the instant invention, one of these incentives is provided by coupons that accompany the cash option or sale of marketing information. The coupon aspect of the invention is explained in greater detail below.

In the gift substitution option and cash option, the recipient can indicate that if the registry is unable to satisfy the giver's purchase request with a purchase, the recipient will accept a substitute gift, or wants the purchase amount in cash. The recipient may ask the registry to conceal the gift substitution option or cash option from the giver, or they may ask the registry to inform the giver that if the purchase request is not satisfied, the request will be satisfied with the gift substitution option or cash option.

In this description, the gift substitution option and the cash option have been treated as somewhat distinct options. However, it is reasonable to consider the cash option as a particular form of gift substitution, where the gift substitute is not another type of good or service, but is cash instead.

It is also possible that the recipient does not register any particular gift ideas, but instead registers gift amounts (e.g. cash contributions) in varying amounts. This might be appropriate for a charity, wanting to have a gift registry, but desiring that all gift contributions be in the form of cash. In this embodiment, the registry may use the marketing type of information gained from gift givers to help offset the cost of the registry. For example, gift givers who have indicated a desire to contribute cash to the local ballet or theater production company, are likely to have an interest in other forms of entertainment related to the ballet or theater. This information can be used to develop targeted coupons that are provided to the gift recipient in conjunction with a gift receipt.

Established and Ad-Hoc Vendors

Once a gift giver has selected a gift idea and made a purchase request, with an associated purchase amount, and system 100 has determined that the purchase amount is greater than or equal to the gift amount, it is possible for system 100 to attempt to satisfy the purchase request.

Figure 5:
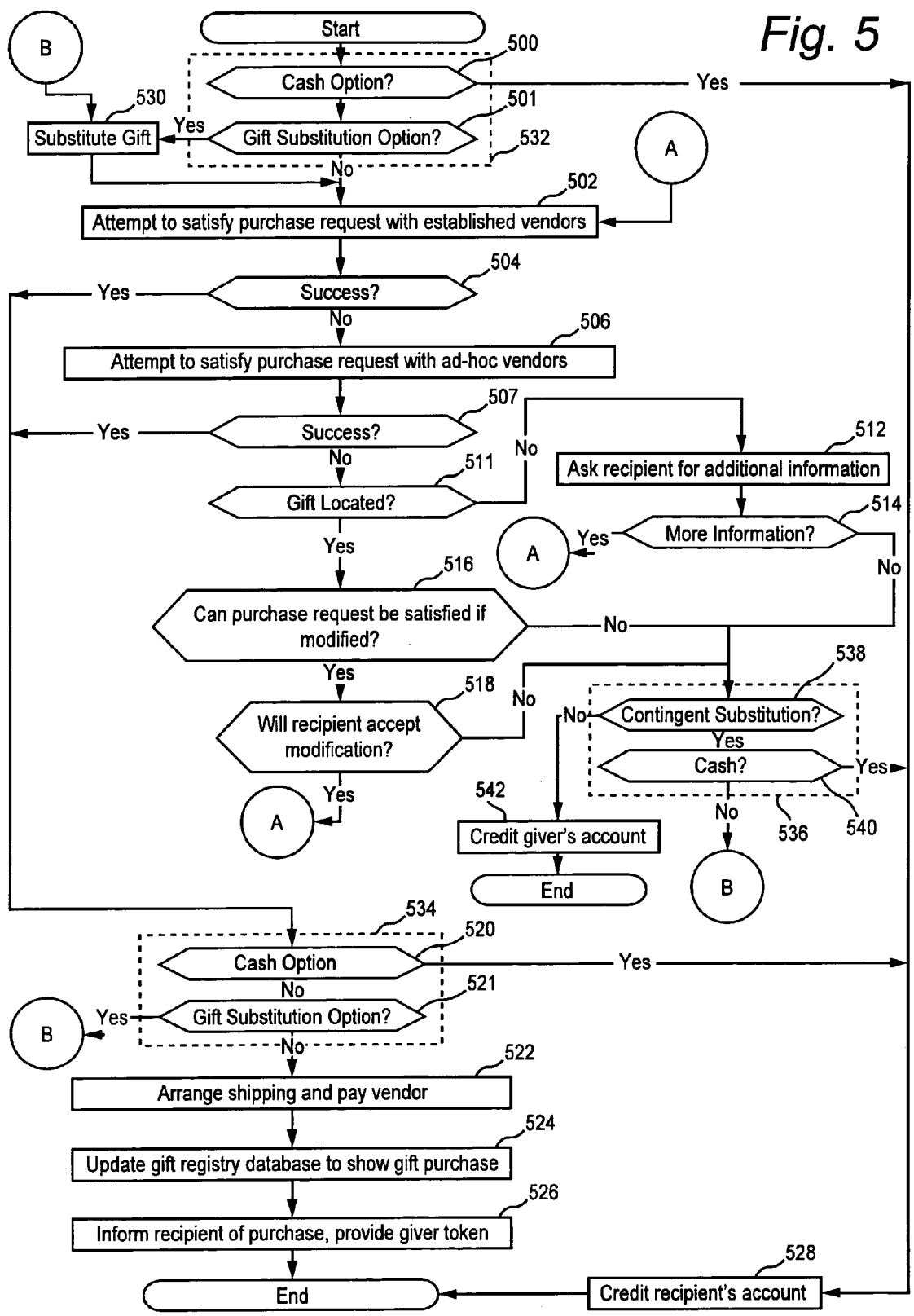
FIG. 5 illustrates an embodiment of steps relating to vendor location and satisfaction of a purchase request in the instant invention.

Referring to FIGS. 1 and 5, at step 532, system 100 first determines whether the recipient has selected a mandatory substitution. The mandatory substitution option at step 534 occurs when the recipient says that they don't care if the gift is available, they want system 100 to substitute for the gift. The substitute can be another gift, or cash. Because a cash substitution is accommodated in a slightly different manner than substitution of another gift, the cash option (step 500) is addressed separately within the mandatory substitution.

The cash option applies to a particular gift, or to all gifts for that recipient in the registry. If the cash option is selected, then at step 528, system 100 credits the recipient's account with the purchase amount and ends. The cash option is described elsewhere in greater detail.

If the cash option is not selected, then at step 501, system 100 determines whether the recipient has selected a gift substitution option. If the gift substitution option is selected, then at step 530, system 100 makes the gift substitution (changes the purchase request to the substitute gift) and attempts to satisfy the purchase request (of the now substituted gift) at step 502. The gift substitution option applies to a particular gift, or to all gifts for that recipient in the registry. The gift substitution option is also described elsewhere in greater detail.

If the recipient has not selected the gift substitution option at step 501, then at step 502, system 100 attempts to satisfy the purchase request with established vendors 110 of system 100. These may be vendors who have an active participation with system 100, such as through providing data or access to data to assist the recipient and gift giver with gift selection, or vendors who actively participate with system 100 in an attempt to satisfy outstanding purchase requests. Alternatively, vendors 10 may be passive, relying on system 100 to contact them with outstanding purchase requests.

The primary distinction between established vendors and ad-hoc vendors is that system 100 has some form of pre-existing relationship with established vendors and has no pre-existing relationship with ad-hoc vendors. It is reasonable that over time, ad-hoc vendors become established vendors, through their interaction with system 100, or through contact by system 100 in an attempt to satisfy outstanding purchase requests.

At step 504, if system 100 is able to satisfy the purchase request at the purchase amount with an established vendor, that gift idea is considered complete within the registry and system 100 begins the process of ordering and delivery. The process of ordering and delivery can take a number of days or weeks. During that time, the recipient may change their mind regarding the gift substitution option or cash option. Accordingly, before the gift is actually shipped to the recipient, at step 534, system 100 again determines if the recipient has selected a mandatory substitution option. Just as the mandatory substitution option at step 532 had two steps, so does the mandatory substitution option at step 534. If system 100 determines that the recipient has selected a cash option at step 520, then at step 528, system 100 credits the recipient's account with the purchase amount and ends.

If at step 520, the recipient has not selected the cash option, then at step 521, system 100 determines whether the recipient has selected the gift substitution option. If so, then at step 530, system 100 cancels the order, substitutes the gift and attempts to satisfy the purchase request with the now substituted gift at step 502.

If the recipient has not selected the gift substitution option at step 521, then at step 522, system 100 arranges shipping of the gift and pays the vendor.

At step 524, system 100 updates the gift registry database to show gift purchase, and at step 526, system 100 informs the recipient of the purchase and provides a token to the giver before ending.

A number of steps are required to maintain and update the database records, complete the purchase of the gift, provide an acknowledgement of the purchase to either or both the recipient and giver, as well as arrange for payment from the gift giver, payment to the vendor and shipment to the desired destination. These are understood to occur in step 522 through 526. Any novel aspects of the invention related to these additional steps are described in greater detail. The other aspects, which are readily understood to those of ordinary skill to occur within the system and method and are not further described herein.

If system 100 was unsuccessful in satisfying the purchase request at step 504 with established vendors, then at step 506, system 100 attempts to satisfy the purchase request with ad-hoc vendors. An ad-hoc vendor is one that does not have a pre-existing relationship with system 100. However, that does not mean that the identity of the ad-hoc vendor is unknown to system 100. For example, when the gift recipient selects a gift idea and associated gift amount, they have an opportunity to also identify a vendor that they believe may be able to provide that gift idea at that gift amount. This is particularly helpful when the gift idea is unusual, or not commonly given as a gift. System 100 maintains information on ad-hoc vendors in server database 128.

At step 508, if system 100 was able to satisfy the purchase request with an ad-hoc vendor, system 100 begins the process of ordering and shipping the gift before again determining if the recipient has selected a cash option at step 520.

At step 510, if system 100 was unable to satisfy the purchase request with either established or ad-hoc vendors, system 100 determines whether the failure is due to inability to locate a vendor that can provide the gift at any price. If system 100 could not locate a vendor who can satisfy the gift idea, the recipient is so informed at step 512 and the recipient is provided an opportunity to provide an identity of an ad-hoc vendor that maybe able to satisfy the gift. At step 514, if the recipient provides additional information, system 100 again attempts to satisfy the purchase request at step 502.

If the recipient does not provide additional information at step 514, then at step 538, system 100 determines whether the recipient has selected a contingent substitution option. A contingent substitution occurs when the gift recipient says that they want system 100 to substitute another gift or cash if and only if the desired gift is unavailable at the price that the recipient has listed, or can not be delivered on time.

Just as the mandatory substitution option included two tests, so does the contingent substitution option (step 536). At step 538, system 100 determines whether the recipient has selected contingent substitution. If not, then at step 542, system 100 credits the gift giver's account and ends.

If the recipient has selected contingent substitution, then at step 540, system 100 determines whether that contingent substitution is cash. If so, then at step 528, system 100 credits the recipient's account and ends. If not, system 100 substitutes the contingent gift at step 530 and attempts to satisfy the request at step 502.

If system 100 determines that the gift was located at step 510, then at step 516, system 100 determines whether the purchase request can be satisfied if it is modified.

If system 100 determines that a modified purchase request can not be satisfied at step 516, then at step 538, system 100 determines whether the recipient has selected the contingent substitution option (step 536), as described above.

If a modified purchase request can be satisfied, then at step 518, system 100 determines whether the recipient will accept the modification.

If system 100 determines at step 518 that the recipient will accept the modified purchase request, then system 100 attempts to satisfy the purchase request at step 502. If not, then system 100 determines whether the recipient has selected the contingent substitution option (step 536), as described above.

Vendor Contact and Bidding There are number of different embodiments for contacting vendors, once gift givers have made purchase requests with associated purchase amounts. One embodiment uses a primarily serial approach. Another embodiment uses a primarily parallel approach. Another embodiment uses an auction type approach. These embodiments can be somewhat combined with each other so that an auction is used with a parallel approach. It is also possible that when the vendors are contacted, they are initially presented with a firm offer that is priced below the purchase amount indicated by a gift giver. The amount of the firm offer is in then incremented until a vendor accepts the offer, or the gift giver's purchase amount is reached. In this manner, system 100 attempts to get the best price for the gift. Any savings can be refunded to the gift giver, provided to the recipient as cash, or retained by the system as profit.

In one embodiment for contacting vendors, system 100 actively seeks vendor responses by sending or providing purchase requests to the vendors. The vendors either respond to those requests, or ignore them. An example of this active approach would be use of e-mail, fax, pager, or telephone to send or provide the request to the vendor. This active approach may use any of a number of different techniques.

In another embodiment for contacting vendors, system 100 is more passive and makes purchase requests available to the vendors. The vendors are able to review these requests and may respond to the requests, or ignore them. An example of this more passive approach would be use of a web page, or bulletin board. This more passive approach may also use any of a number of different techniques. Thus, one difference between the active and more passive approach is whether the system provides the requests to the vendors, or whether the system merely makes the requests available to the vendors.

Aspects of these embodiments for contacting vendors and bidding are described in greater detail below.

Serial Approach

Figure 6:
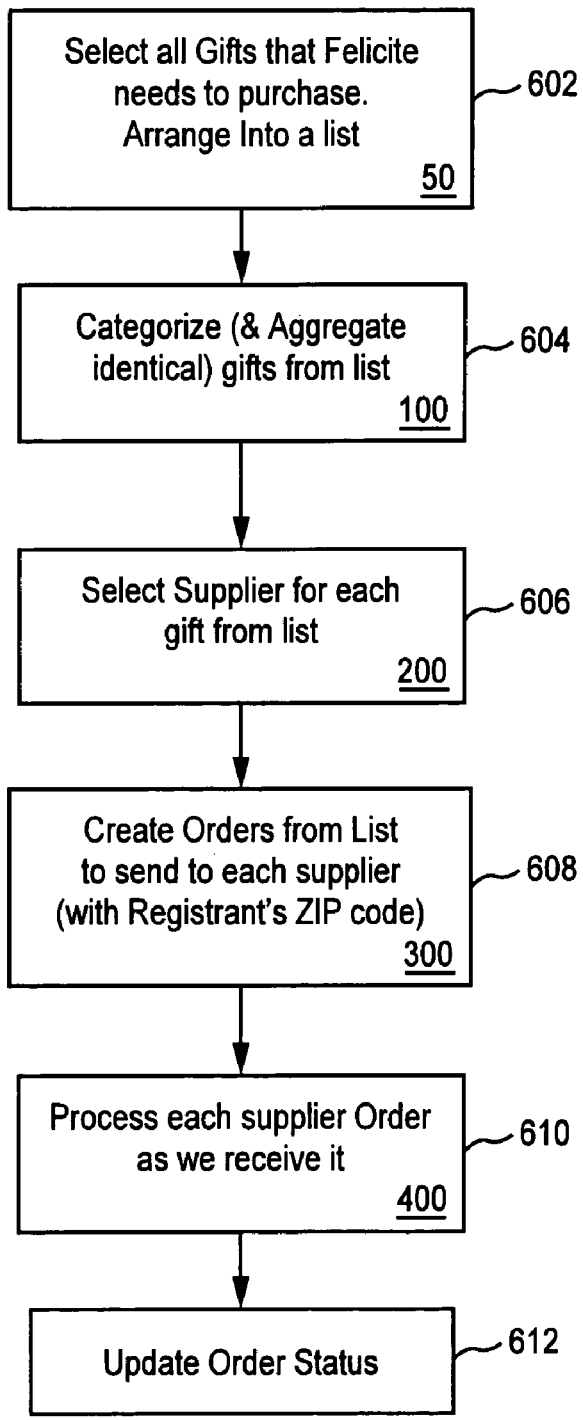
FIG. 6 illustrates a summary of an embodiment of steps relating to selection of vendors and satisfaction of the purchase request in the instant invention.

In a serial embodiment, system 100 sends a firm offer for purchase, or a solicitation for an offer (such as provided within the Uniform Commercial Code) to each vendor and waits for the vendor to reply. Once a vendor has accepted the firm offer for purchase or the vendor responds to the solicitation with an offer and system 100 accepts the vendor offer, the gift is accepted and system 100 asks the vendor to deliver the gift. The steps in this embodiment are summarized in FIG. 6. At step 602, system 100 selects all gifts that need to be purchased, and arranges the gifts in a list.

At step 604, system 100 categorizes and aggregates identical gifts on the list. For example, if three different registries need three identical items, system 100 aggregates the individual registry items into a single order for three of the same item, with three different delivery zip codes. Step 604 includes other steps, which are illustrated more fully in FIG. 7.

At step 606, system 100 selects a vendor for each gift from the list. Step 606 includes other steps, which are illustrated more fully in FIG. 8.

At step 608, system 100 creates orders from the list to send to each vendor. Step 608 includes other steps, which are illustrated more fully in FIG. 9.

At step 610, system 100 processes each vendor order as it is received. Step 610 includes other steps, which are illustrated more fully in FIG. 10.

At step 612, system 100 updates the order status.

Figure 7:
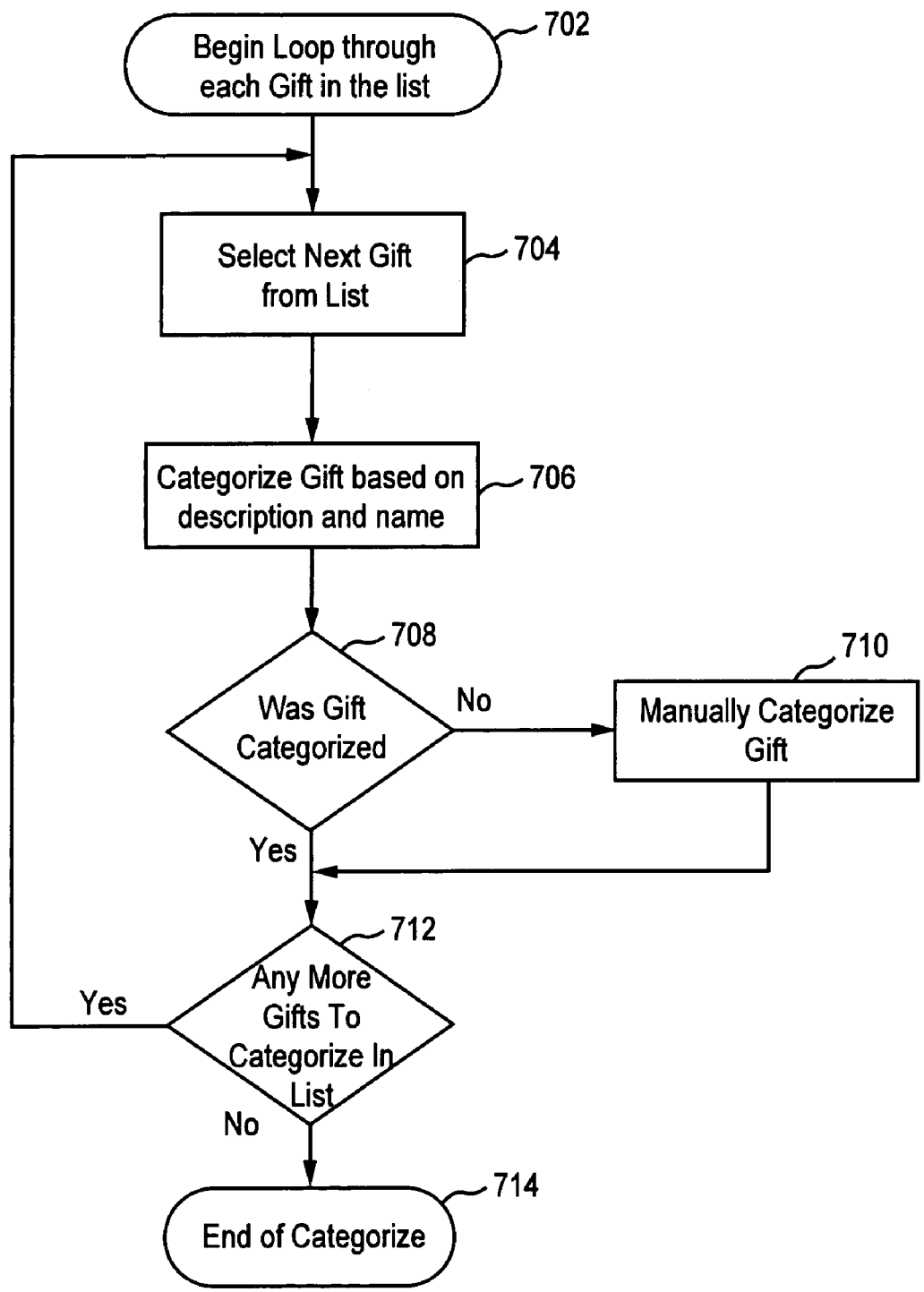
FIG. 7 illustrates an embodiment of steps relating to categorizing gifts in the instant invention.

FIG. 7 illustrates an embodiment for categorizing and aggregating gifts from the list. At step 702, system 100 begins a loop through each gift in the list.

At step 704, system 100 selects the next gift from the list.

At step 706, system 100 categorizes the gift based on the description and name.

At step 708, system 100 determines whether the gift was categorized, and if not, at step 710, system 100 arranges for a manual categorization of the gift.

At step 712, system 100 determines whether additional gifts remain to categorize on the list, and if so, loops to step 704. If not, categorization ends at step 714.

Figure 8:
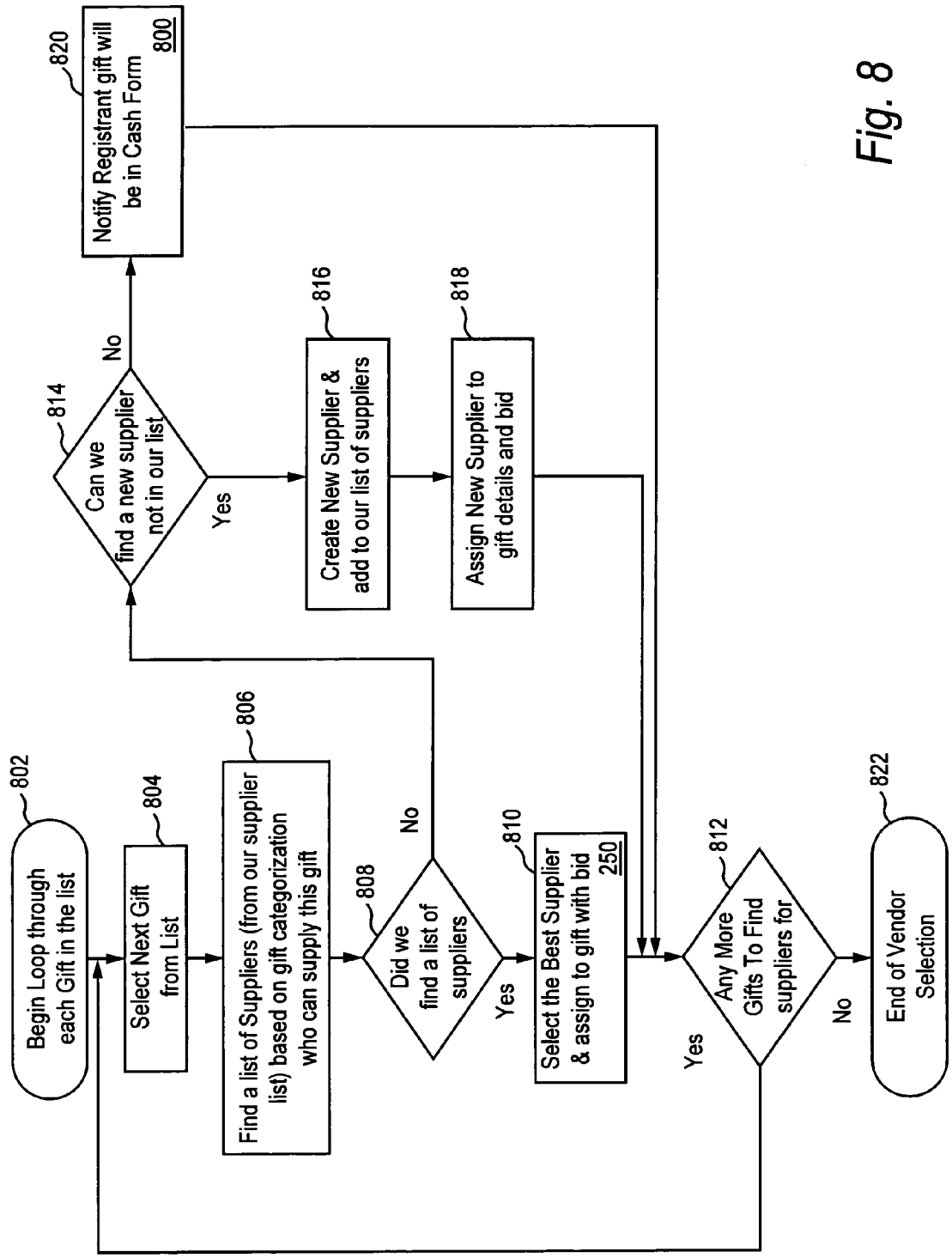
FIG. 8 illustrates an embodiment of steps relating to selection of vendors to satisfy the purchase request in the instant invention.

FIG. 8 illustrates an embodiment for selecting a vendor for gifts on the list. At step 802, system 100 begins to select vendors.

At step 804, system 100 selects the next gift from the list.

At step 806, system 100 finds an established vendor based on the gift categorization and indications of which vendor can provide the gift.

Figure 11:
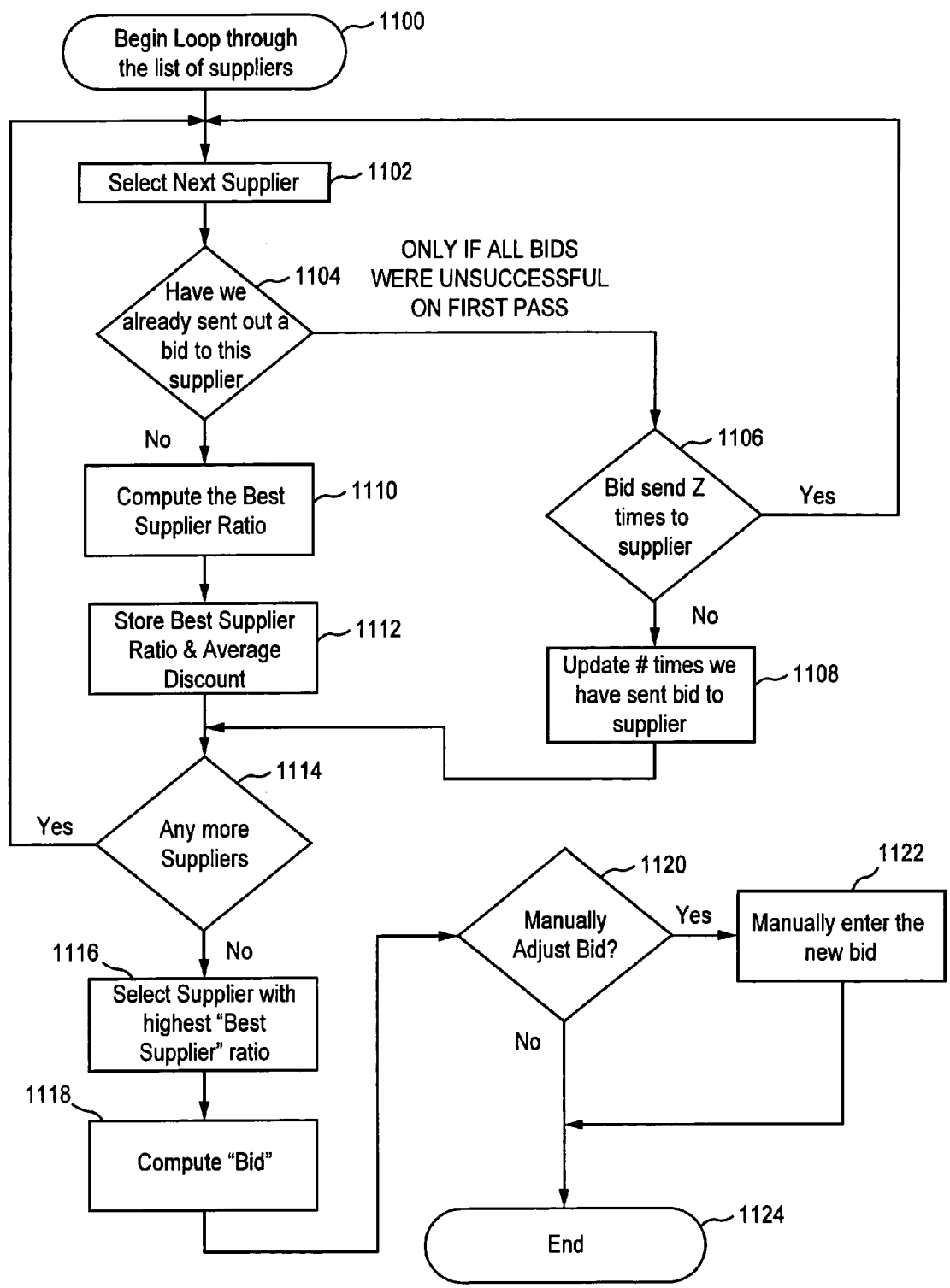
FIG. 11 illustrates an embodiment of steps relating to selection of vendors to satisfy the purchase request in the instant invention.

At step 808, system 100 determines whether a established vendor was identified from the list. If so, then at step 810, system 100 selects the best established vendor and assigns a gift with a bid to that vendor. Step 810 includes additional steps, which are illustrated in FIG. 11.

If an established vendor was not identified at step 808, then at step 814, system 1100 determines whether an ad-hoc vendor if available. If so, then at step 816, system 100 designates the ad-hoc vendor as a new vendor and adds them to the list of established vendors. At step 818, system 100 selects the best ad-hoc vendor and assigns a gift with a bid to that vendor.

Figure 12:
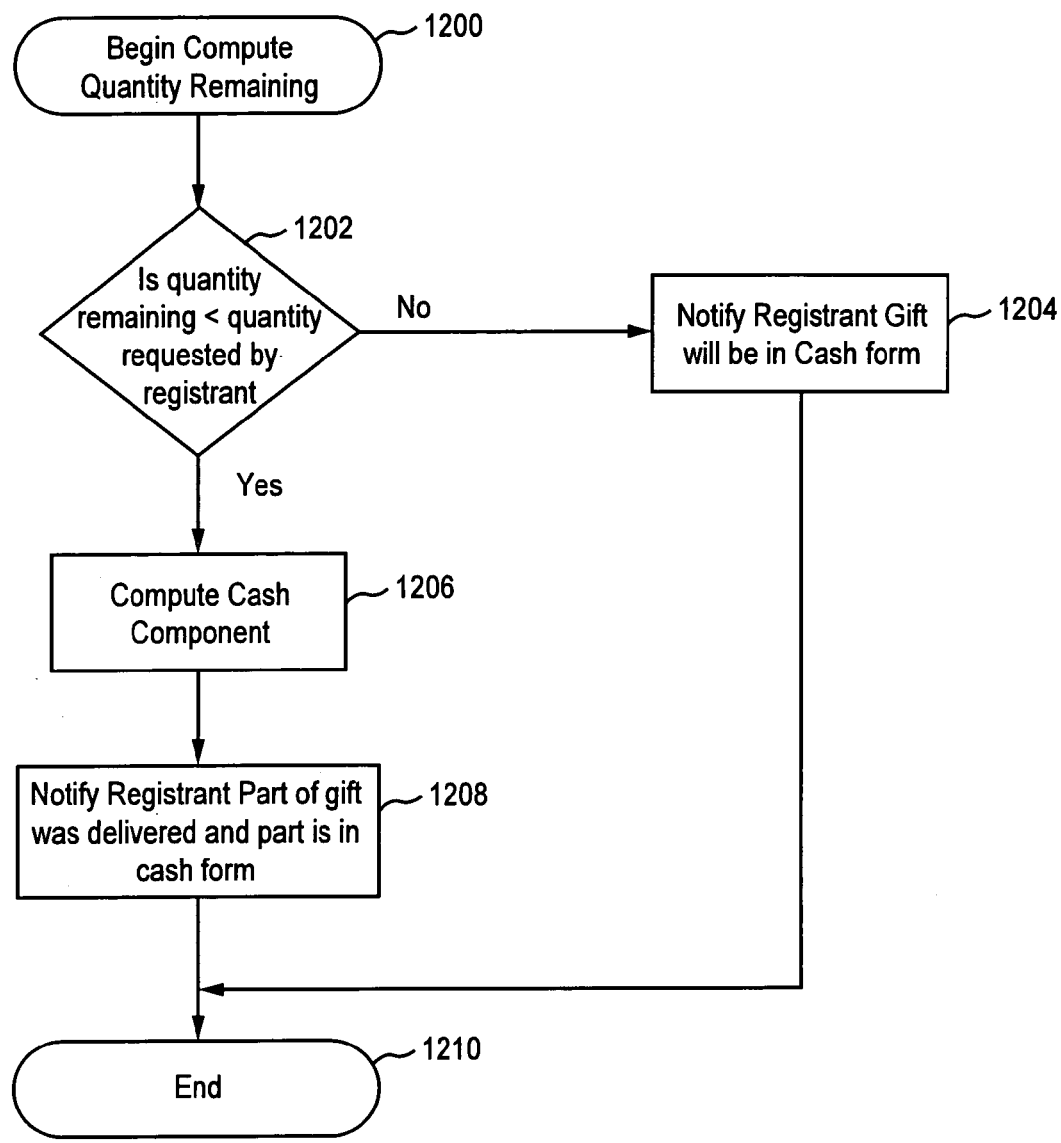
FIG. 12 illustrates an embodiment of steps relating to a cash option in the instant invention.

If system 100 could not locate an ad-hoc vendor at step 814, then at step 820, system 100 notifies the recipient that the gift was unavailable and therefore contingent substitution has taken place. If the contingent substitution is for cash, then the account of the gift recipient is credited, and the process ends. If the contingent substitution is for another gift, then the substitution is made and we go back to the start. If there was no contingent substitution, the gift giver's account is credited. Step 820 includes additional steps, which are illustrated in FIG. 12.

At step 812, system 100 determines whether additional gifts remain that require vendors, and if so, loops to step 804.

At step 822, system 100 completes the vendor selection.

Figure 9:
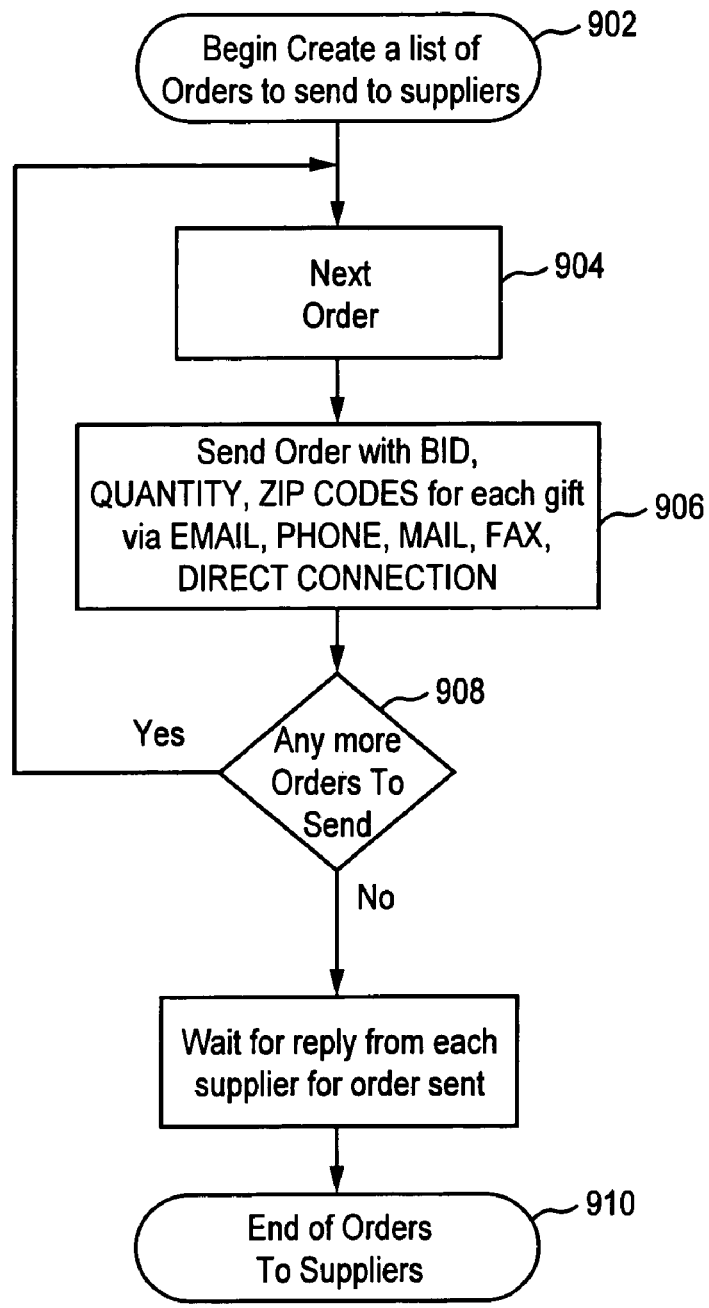
FIG. 9 illustrates an embodiment of steps relating to sending purchase requests to vendors to satisfy the purchase request in the instant invention.

FIG. 9 illustrates an embodiment for creating and sending orders from the list to vendors. At step 902, system 100 begins to generate orders from the list.

At step 904, system 100 selects the next unprocessed order.

At step 906, system 100 sends the order to the vendor. The order includes bid, quantity, zip codes for each gift. The order is sent by the method most appropriate for the vendor, and may include e-mail, mail, fax, telephone, or a direct connection.

At step 908, system 100 determines whether additional orders remain to be sent, and if so, loops to step 904.

At step 910, system completes sending orders from the list.

Figure 10:
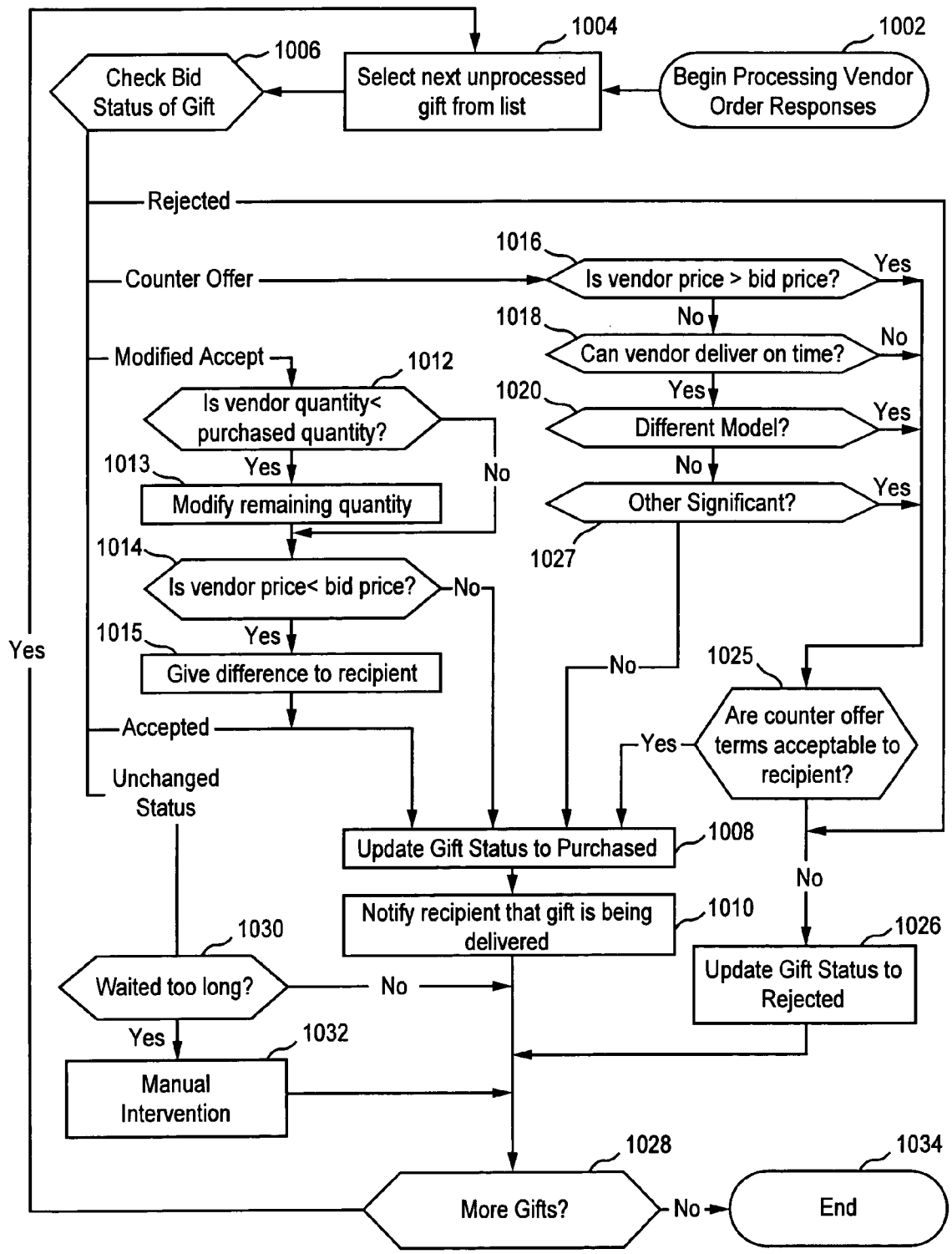
FIG. 10 illustrates an embodiment of steps relating to checking vendor responses in the instant invention.

FIG. 10 illustrates an embodiment for processing vendor orders as they are received. At step 1002, system 100 begins to process vendor orders.

At step 1004, system 100 selects the next unprocessed gift from the list.

At step 1006, system 100 determines the bid status of the gift. If the status is indicated as rejected, then at step 1026, system 100 updates the gift status to rejected and checks for more gifts at step 1028.

If at step 1006, system 100 determines that the bid status is counter offer, then at step 1016, system 100 determines whether the vendor price is greater than the purchase price. If so, then at step 1025, system 100 determines whether the counter offer terms are acceptable to the recipient. If the terms are not acceptable, then at step 1026, system 100 updates the gift status as rejected by this vendor.

If at step 1016, system 100 determines that the vendor price is not higher than the purchased price, then at step 1018, system 100 determines whether the vendor can deliver on time. If not, then at step 1025, system 100 determines whether the counter offer terms are acceptable to the recipient. If the terms are not acceptable, then at step 1026, system 100 updates the gift status as rejected by this vendor.

If at step 1018, system 100 determines that the vendor can deliver on time, then at step 1020, system 100 determines whether vendor 100 is counter offering with a different model. If so, then at step 1025, system 100 determines whether the counter offer terms are acceptable to the recipient. If the terms are not acceptable, then at step 1026, system 100 updates the gift status as rejected by this vendor.

If at step 1020, system 100 determines that the model is the same, then at step 1027, system 100 determines whether the other counter offer terms are significant. If the counter offer terms are significant, then at step 1025, system 100 determines whether the counter offer terms are acceptable to the recipient. If the terms are not acceptable, then at step 1026, system 100 updates the gift status as rejected by this vendor.

Figure 13:
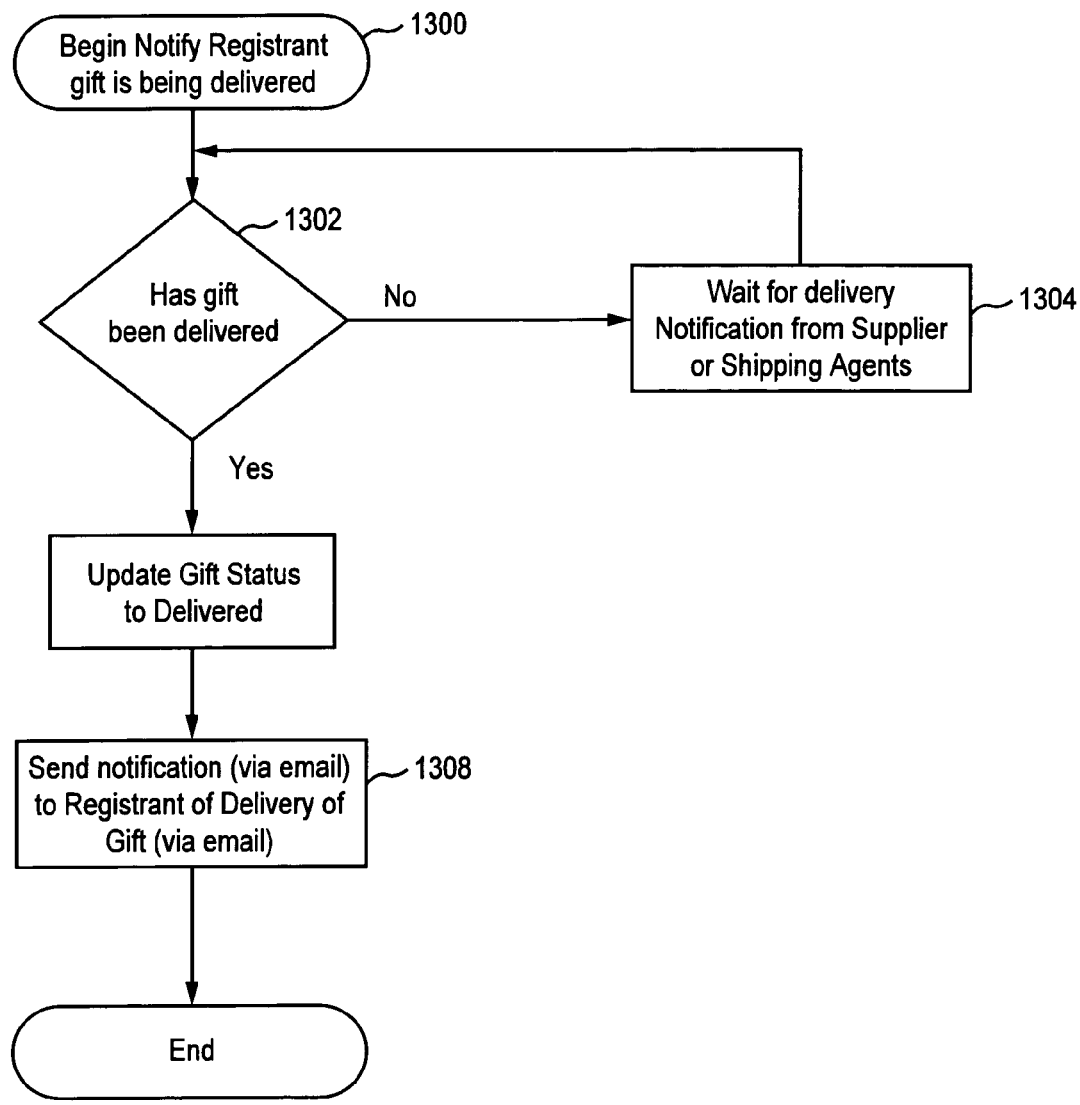
FIG. 13 illustrates an embodiment of steps relating to informing the recipient of gift shipment in the instant invention.

If at step 1027, the other counter offer terms are not significant, then at step 1008, system 100 updates the gift status to purchased and informs the recipient of shipment at step 1010. Step 1010 includes additional steps, which are illustrated in FIG. 13.

If at step 1006, system 100 determines that the bid status is modified acceptance, then at step 1012, system 100 determines whether the vendor quantity is less than the purchased quantity. If so, then at step 1013, system 100 modifies the remaining quantity.

If at step 1012, system 100 determines that the vendor quantity is not less than the purchased quantity, then at step 1014, system 100 determines whether the vendor price is less than the bid price. If so, then at step 1015, the difference is given to the recipient.

If the vendor prices is not less than the bid price, then at step 1008, system 100 updates the gift status to purchased from this vendor, and at step 1010, notifies the recipient that the gift is being delivered.

If at step 1006, system 100 determines that the bid status is accepted, then at step 1008, system 100 updates the gift status to purchased from this vendor, and at step 1010, system 100 notifies the gift recipient that the gift is being delivered.

If at step 1006, system 100 determines that the bid status is unchanged, then at step 1030, system 100 determines whether a pre-set time limit has expired. If so, then at step 1032, system 100 arranges for manual intervention, and checks for more gifts at step 1028.

If at step 1030, system 100 determines that the pre-set time limit is not expired, then at step 1028, system 100 checks for more gifts.

If at step 1028, system 100 determines there are additional gifts, then it arranges to loop to step 1004. If not, system 100 ends this set of processing steps at step 1034.

FIG. 11 illustrates an embodiment for selecting the best vendor. Though the steps illustrated here are particularly appropriate for a serial bidding embodiment, they can also be used for a parallel offer embodiment when multiple vendors respond within the deadline and a selection among responding vendors is required.

At step 1100, system 100 begins the steps to selection the best vendor.

At step 1102, system 100 selects the next vendor for consideration.

At step 1104, system 100 determines whether a bid has already been sent to this vendor. If so, and only if all bids were unsuccessful on the first pass, then at step 1106, system 100 determines whether the bid has been sent Z times to the vendor. If it has, system 100 loops to step 1102. If not, then at step 1108, system 100 updates the number of times the bid has been sent to the vendor.

If at step 1104, system 100 determined that a bid has not already been sent to this vendor, then at step 1110, system 100 computes the best supplier ratio for the vendor, and at step 1112, stores the ratio and average discount.

The process of computing the best supplier ratio at step 1110 includes a number of factors and is a function of bid hit ratio (number of accepted bids/number of bids sent), modified hit ratio (number of accepted bids for category/number of bids for category), commission or discount, tenure (how long the vendor relationship has existed), speed of delivery, delivery ratio (number of on-time deliveries/number of accepted offers), average shipping costs, complaint ratio (number of complaints/number of accepted offers), payment terms, and subjective factors such as whether to encourage a particular vendor.

At step 1114, system 100 determines whether there are additional vendors for consideration, and if so, loops to step 1102.

If at step 1114 no additional vendors need consideration, then at step 1116, system 100 selects the vendor with the best or highest supplier ratio.

At step 1118, system 100 computes the bid. The bid is a function of market price of a gift, recipient's price of the gift, bid hit ratio, category margin/discount by vendor and number of times the bid has been sent to the supplier.

At step 1120, system 100 determines whether the bid should be manually adjusted. If so, then at step 1122, the bid is manually entered.

At step 1124, system 100 completes the steps to select the best vendor.

FIG. 12 illustrates an embodiment for notifying the recipient that the gift will be in cash form. At step 1200, system 100 begins by computing the quantity remaining.

At step 1202, system 100 determines whether the quantity remaining is less than the quantity requested by the recipient. If it is not, then at step 1204, system 100 notifies the recipient that the gift will be in a cash form.

At step 1206, system 100 computes the cash component, and at step 1208, notifies the recipient that part of the gift will be delivered, and part will be in a cash form.

At step 1210, system 100 completes the step for the cash form of gift.

FIG. 13 illustrates and embodiment for notifying the recipient that the gift is being delivered. At step 1300, system 100 begins the steps to notify the recipient that the gift is being delivered. The notification is typically by e-mail, but any form that is designated by the recipient is appropriate, such as mail, fax or telephone call.

At step 1302, system 100 determines whether the gift has been delivered. This is based on a delivery notification from the vendor or shipping agent. If not, at step 1304, system 100 waits for a delivery notification, and loops to step 1302.

If the gift has been delivered, as provided by the delivery notification from the vendor or shipping, then at step 1306, system 100 updates the status as delivered.

At step 1308, system 100 sends the actual notification to the recipient, and completes the notification process at step 1310.

This completes a description of an embodiment for serial allocation of gift bids to a plurality of vendors.

Parallel Approach

Figure 14:
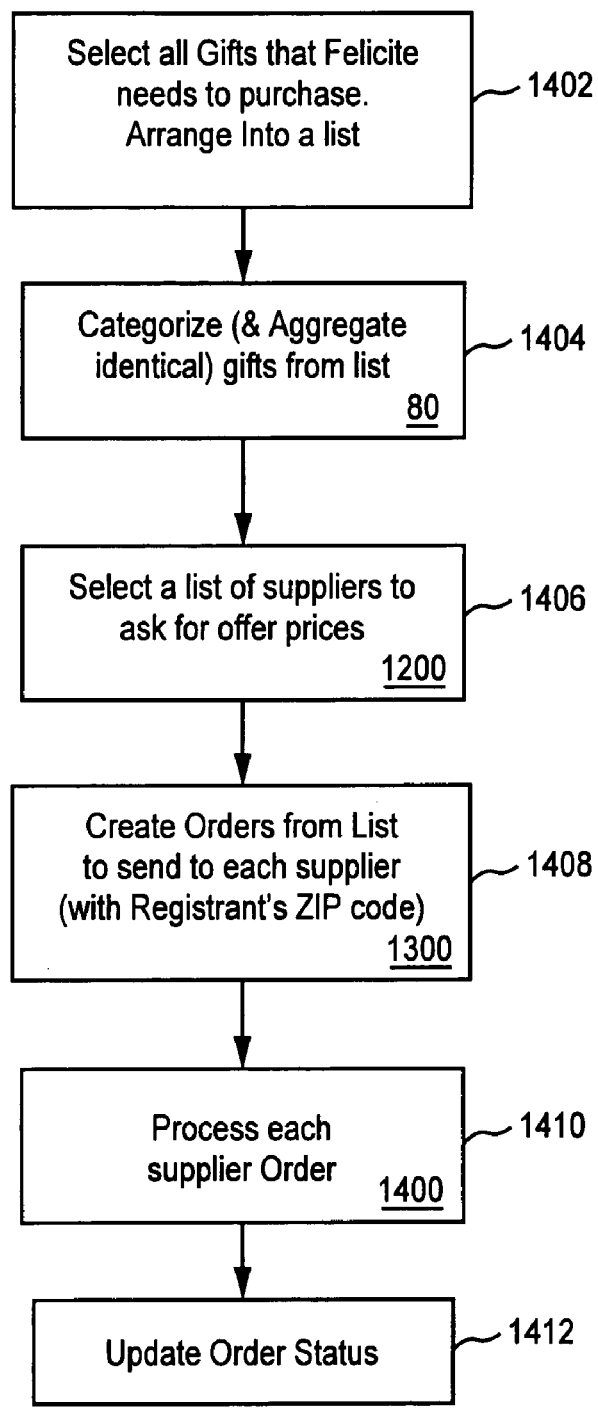
FIG. 14 illustrates a summary of an embodiment of steps relating to selection of vendors and satisfaction of the purchase request in the instant invention.

In a parallel embodiment, system 100 sends a request for a firm offer to multiple vendors in parallel and then determines which of the responding offers to select. Once a gift has been accepted, system 100 asks the vendor to deliver the gift. The steps in this embodiment are summarized in FIG. 14. At step 1402, system 100 selects all gifts that need to be purchased, and arranges the gifts in a list.

At step 1404, system 100 categorizes and aggregates identical gifts on the list. For example, if three different registries need three identical items, system 100 aggregates the individual registry items into a single order for three of the same item, with three different delivery zip codes. Step 1404 includes other steps, which are illustrated more fully in FIG. 7.

At step 1406, system 100 selects one or more vendors to be contacted for each gift or aggregated gifts from the list. This is somewhat like a shotgun, where multiple request for offers are sent to many vendors at the same time. Step 1406 includes other steps, which are illustrated more fully in FIG. 15.

At step 1408, system 100 creates requests for offers from the list to send to each vendor. Step 1408 includes other steps, which are illustrated more fully in FIG. 16.

At step 1410, system 100 processes each vendor offer as it is received. Step 1410 includes other steps, which are illustrated more fully in FIG. 17.

At step 1412, system 100 updates the request for offer status.

As described above, FIG. 7 illustrates an embodiment for categorizing and aggregating gifts from the list. At step 702, system 100 begins a loop through each gift in the list.

At step 704, system 100 selects the next gift from the list.

At step 706, system 100 categorizes the gift based on the description and name.

At step 708, system 100 determines whether the gift was categorized, and if not, at step 710, system 100 arranges for a manual categorization of the gift.

At step 712, system 100 determines whether additional gifts remain to categorize on the list, and if so, loops to step 704. If not, categorization ends at step 714.

Figure 15:
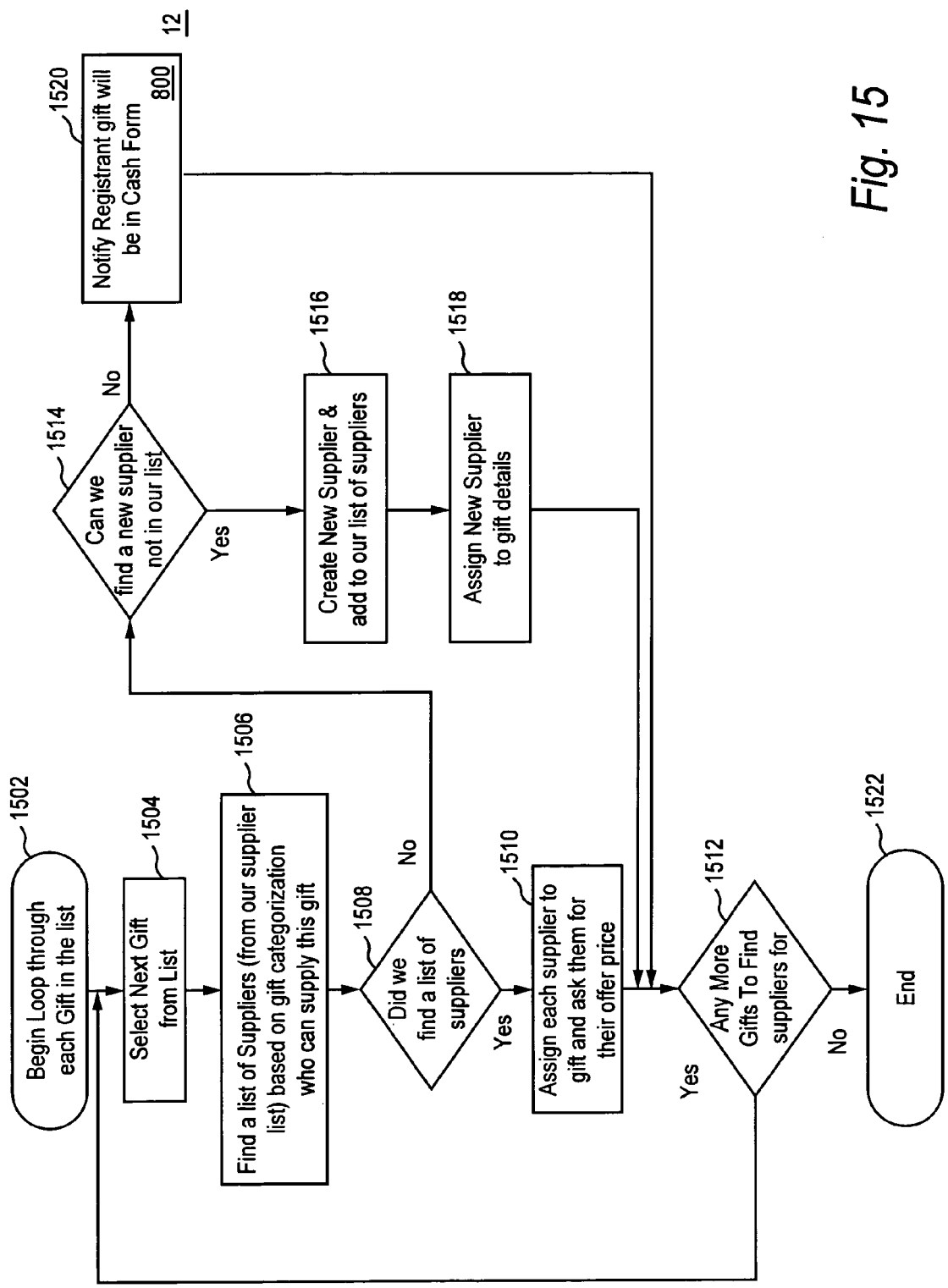
FIG. 15 illustrates an embodiment of steps relating to selection of vendors to satisfy the purchase request in the instant invention.

FIG. 15 illustrates an embodiment for selecting vendors for gifts on the list. At step 1502, system 100 begins to select vendors.

At step 1504, system 100 selects the next gift from the list.

At step 1506, system 100 finds established vendors based on the gift categorization and indications of which vendor can provide the gift.

At step 1508, system 100 determines whether established vendors were identified from the list. If so, then at step 1510, system 100 assigns each vendor to a gift and asks the vendor for an offer price for the gift.

If an established vendor was not identified at step 1508, then at step 1514, system 100 determines whether one or more ad-hoc vendors are available. If so, then at step 1516, system 100 designates each ad-hoc vendor as a new vendor and adds them to the list of established vendors. At step 1518, system 100 sends the gift details to each new vendor and asks them for an offer price for the gift.

If system 100 could not locate an ad-hoc vendor at step 1514, then at step 1520, system 100 notifies the recipient that contingent substitution will occur. Step 1520 includes additional steps, which are illustrated in FIG. 12.

At step 1512, system 100 determines whether additional gifts remain that require vendors, and if so, loops to step 1504.

At step 1522, system 100 completes the vendor selection.

Figure 16:
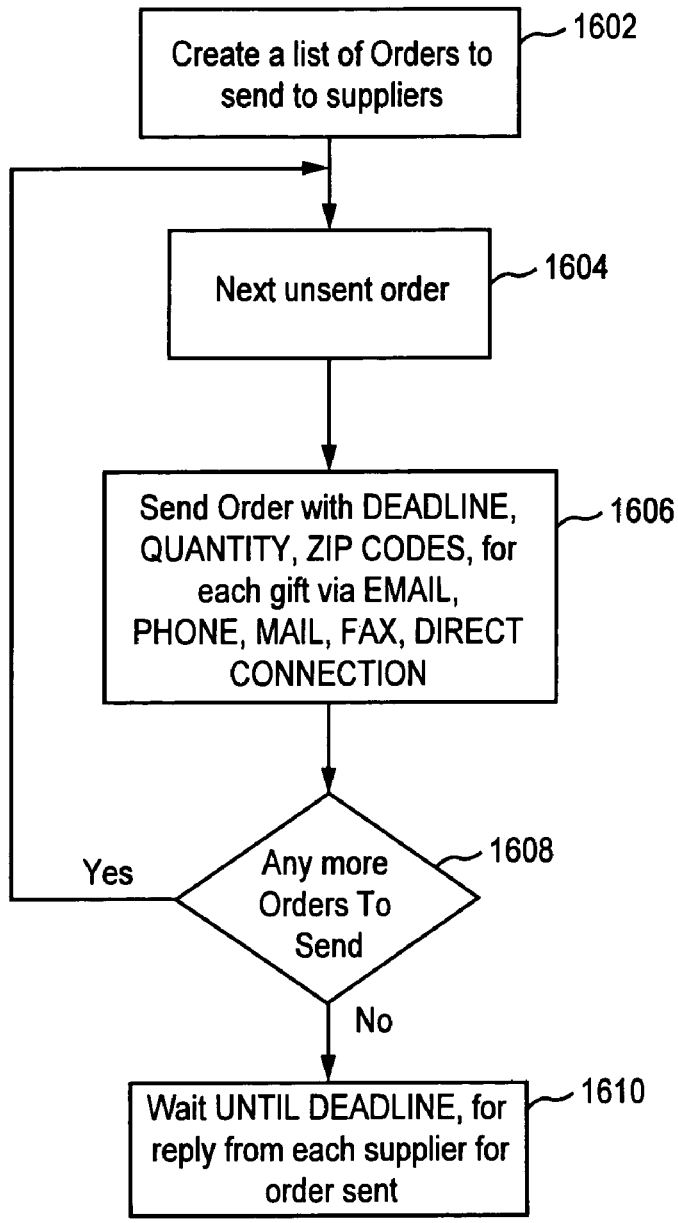
FIG. 16 illustrates an embodiment of steps relating to sending purchase requests to vendors to satisfy the purchase request in the instant invention.

FIG. 16 illustrates an embodiment for creating and sending orders from the list to the vendors. At step 1602, system 100 begins to generate orders from the list.

At step 1604, system 100 selects the next unprocessed order.

At step 1606, system 100 sends the order to the vendor. The order includes deadline, quantity, zip codes for each gift. The order is sent by the method most appropriate for the vendor, and may include e-mail, mail, fax, telephone, or a direct connection.

At step 1608, system 100 determines whether additional orders remain to be sent, and if so, loops to step 1604.

At step 1610, system completes sending orders from the list.

Figure 17:
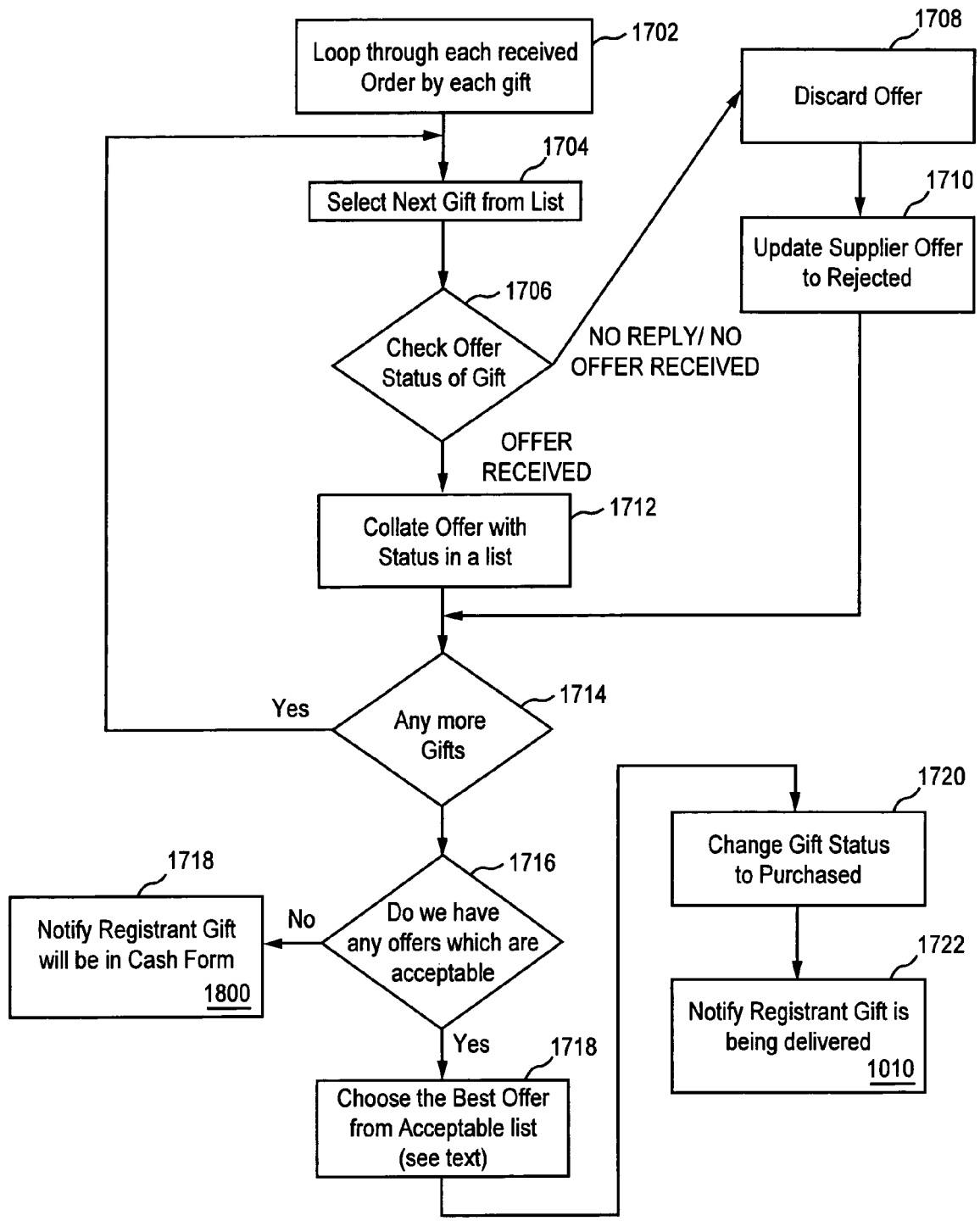
FIG. 17 illustrates an embodiment of steps relating to checking vendor responses in the instant invention.

FIG. 17 illustrates an embodiment for processing vendor orders at the expiration of the deadline. At step 1702, system 100 begins to process vendor orders.

At step 1704, system 100 selects the next unprocessed gift from the list.

At step 1706, system 100 determines the offer status of the gift. If the status is indicated as no reply/no offer received, then at step 1708, system 100 discards the offer and at step 1710, updates the vendor status as rejected for that offer.

If at step 1706, system 100 determines that the offer status is offer received, then at step 1712, system 100 correlates the offer with the status on the list.

At step 1714, system 100 determines whether there are any more gifts. If so, then system 100 loops to step 1704.

At step 1716, system 100 determines whether there are any offers which are acceptable. If not, then at step 1718, system 100 notifies the recipient that the gift will be in cash form.

At step 1718, system 100 selects the best of the acceptable offers. This selection considers the offer price, delivery, commission or discount, tenure (how long the vendor relationship has existed), speed of delivery, delivery ratio (number of on-time deliveries/number of accepted offers), average shipping costs, complaint ratio (number of complaints/number of accepted offers), payment terms, highest quantity, and subjective factors such as whether to encourage a particular vendor.

At step 1720, system 100 updates the gift status to purchased and informs the recipient of shipment at step 1722. Step 1722 includes additional steps, which are illustrated in FIG. 13.

As described above, FIG. 12 illustrates an embodiment for notifying the recipient that the gift will be in cash form. At step 1200, system 100 begins by computing the quantity remaining.

At step 1202, system 100 determines whether the quantity remaining is less than the quantity requested by the recipient. If it is not, then at step 1204, system 100 notifies the recipient that the gift will be in a cash form.

At step 1206, system 100 computes the cash component, and at step 1208, notifies the recipient that part of the gift will be delivered, and part will be in a cash form.

At step 1210, system 100 completes the step for the cash form of gift.

As described above, FIG. 13 illustrates and embodiment for notifying the recipient that the gift is being delivered. At step 1300, system 100 begins the steps to notify the recipient that the gift is being delivered. The notification is typically by e-mail, but any form that is designated by the recipient is appropriate, such as mail, fax or telephone call.

At step 1302, system 100 determines whether the gift has been delivered. This is based on a delivery notification from the vendor or shipping agent. If not, at step 1304, system 100 waits for a delivery notification, and loops to step 1302.

If the gift has been delivered, as provided by the delivery notification from the vendor or shipping, then at step 1306, system 100 updates the status as delivered.

At step 1308, system 100 sends the actual notification to the recipient, and completes the notification process at step 1310.

Auction Approach

In an auction embodiment, system 100 posts an order in an accessible interactive on-line location, such as at a web page, that is accessible by multiple vendors and then conducts an auction for the desired gift with associated delivery conditions. The system may actively inform potential vendors of the order, or passively post the order and await vendors. In the auction embodiment, instead of attempting to develop the highest price for the gift, the auction attempts to develop the lowest price for the gift within the acceptable delivery terms. In one embodiment, the auction is blind, with individual vendor identity hidden from others, while in another embodiment, the auction is open with vendors able to determine who the other participants are. The auction is timed, with the vendor offering the best price and delivery terms at the end of the auction being automatically selected. Once the auction for the gift is closed, system 100 arranges for the vendor to deliver the gift.

Published Firm Offer

In one embodiment, an alternative approach is first-come-first serve. Each available offer is posted as a firm offer along with the maximum price and the zip code of the gift recipient. The first vendor to indicate acceptance of the posted offer binds the system and therefore gets the deal. The firm offer is subsequently removed from the web site. This embodiment includes various steps (not illustrated) to ensure that only one vendor can accept any single firm offer.

Coupon Supplement

As indicated above, one of the reasons that traditional gift registry services may not provide a cash option is that the profit source or motive is unclear. With the increasing understanding that information is a commodity with value, the opportunities for profit using information gained through a transaction are better understood. For example, when the recipient registers with system 100, there is certain information that can be learned directly, or readily inferred from the circumstances of the registration. The recipient's address and telephone number provide information to identify them. The recipient also provides information regarding the gift event (wedding, birthday, graduation etc.) The recipient similarly identifies certain near-term wants or desires. All of this is valuable marketing information that is directly linked to a particular consumer. The information is part of the recipient profile, which can be used to predict future purchases and spending habits. The information is also helpful in identifying individuals who have recently undergone transition in their life-style with an associated change in their habits.

The instant invention uses this information as a profit source to help offset the cost of operation that would normally be covered by profit from the sale of goods/services. For example, if a recipient has identified a television as a gift idea, and has provided a corresponding gift amount for the television that is less than the retail cost from established vendors, normally they would not get the television. If the recipient has selected contingent substitution into cash, system 100 will determine that the recipient desires to receive cash if the gift is not available at the gift amount. The fact that the recipient desires to purchase the television, and now has just received cash with which to make his purchase is valuable information. Instead of merely providing the cash to the recipient, system 100 uses this information to locate related coupons to include with the cash.

For example, a discount coupon for a particular television brand is available, allowing the recipient to purchase that brand television for only slightly more than the gift amount. When system 100 provides that coupon with the cash, the recipient is strongly influenced to purchase that brand television rather than another brand. The discount television coupon was targeted to an individual who has expressed a near-term interest in purchasing a television, who has also identified their purchase price range, and who has the means with which to make the purchase. The individual is as they say, "ready, willing and able." This is extremely valuable information. The potential return on the marketing investment is much greater for this coupon, as compared to other distribution sources. Accordingly, the television manufacturer is willing to pay a premium to have system 100 include their coupon with a cash option.

Although illustrative embodiments have been described herein in detail, it should be noted and will be appreciated by those skilled in the art that numerous variations may be made within the scope of this invention without departing from the principle of this invention and without sacrificing its chief advantages.

One variation of the invention includes user access of the system from within an establishment, such as using a computer at the establishment, or a computer at a shopping mall.

In one variation, the gift is anonymous, with system 100 concealing the gift giver's identity from the recipient.

In one variation, the gift recipient registers a cash gift as the gift idea with the desired cash amount as the gift idea. The gift giver then makes a gift of cash by selecting that cash gift as the purchase request with associated purchase amount. Accordingly, in FIG. 5, the decision flow may assume that the gift is a cash option (step 500), and the cash gift is then directly credited to the recipients account at step 528. Alternatively, the decision flow may follow the other decision steps in FIG. 5 but the shipping at step 522 occurs through credit of the recipient account rather than a physical package.

In one variation, it is also possible that a traditional establishment handles all of the recipient interface to system 100. In this variation, system 100 is transparent to the recipient and the additional enhancements provided by the invention (gift substitution option, cash option, coupons, tokens, etc.) appear to be enhancements of a normal in-store gift registry.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for enabling a plurality of gift givers to each make a respective commitment for a monetary contribution of any giver-desired amount toward a gift for a gift recipient, the method comprising:
   receiving at a centralized gift registry computer system gift ideas supplied by the gift recipient;
   storing the gift ideas in a memory which is part of, or accessible to, said gift registry computer system;
   providing to the gift givers, based on the stored gift ideas and in response to requests supplied to said gift registry computer, an on-line display of the gift ideas, wherein the on-line display of the gift ideas reflects uncommitted balances of purchase prices for one or more of the gift ideas having a partial purchase option;
   receiving at said gift registry computer system commitments from the gift givers for monetary contributions toward a purchase price of a gift having the partial purchase option selected from the on-line display of gift ideas;
   combining the commitments for monetary contributions and updating the display;
   automatically generating a purchase request for the selected gift if the total of the combined commitments is equal to or greater than the selected gift's purchase price; and
   attempting to satisfy the purchase request,
   wherein the commitment of each giver that commits to make a monetary contribution is for any giver-desired portion of the uncommitted balance of the selected gift's purchase price.

2. The method according to claim 1, wherein the commitment of each giver that commits to make a monetary contribution is directly specified by the gift giver as an amount of currency.

3. The method according to claim 1, wherein the providing of an on-line display of the gift ideas comprises:
   generating one or more web pages based on the gift ideas supplied by the gift recipient; and
   supplying the generated web pages to the gift givers in response to giver-supplied requests.

4. The method according to claim 1, wherein attempting to satisfy the purchase request comprises:
   sending the purchase request to a supplier.

5. The method according to claim 1, wherein the receiving of commitments from the gift givers comprises:
   receiving credit card information supplied by the gift givers that make commitments.

6. The method according to claim 1, wherein the receiving of commitments from the gift givers comprises:
   receiving commitments from the gift givers that include commitments which are contingent upon other gift givers making commitments such that a final total of the combined commitments is equal to or greater than the selected gift's purchase price.

7. The method according to claim 1, wherein
   the receiving of gift ideas from a gift recipient comprises receiving at least one gift idea that specifies a substitute gift.

8. The method according to claim 1, further comprising:
   providing the commitments for monetary contributions to the gift recipient as cash if a final total of the combined commitments is less than the selected gift's purchase price.

9. The method according to claim 1, wherein one or more of the gift ideas specified by the gift recipient is associated with a recipient-determined purchase price for the gift idea.

10. The method according to claim 1, wherein one or more of the gift ideas specified by the gift recipient is associated with a recipient-determined vendor for the gift idea.

11. A method for enabling a plurality of gift givers to each make a respective commitment for a monetary contribution of any giver-desired amount toward a gift for a gift recipient, the method comprising:
    receiving at a centralized gift registry computer system gift ideas supplied by the gift recipient;
    storing the gift ideas in a memory which is part of, or accessible to, said gift registry computer system;
    providing to the gift givers, based on the stored gift ideas and in response to requests supplied to said gift registry computer, an on-line display of the gift ideas, wherein the on-line display of the gift ideas reflects uncommitted balances of purchase prices for one or more of the gift ideas having a partial purchase option;
    receiving at said gift registry computer system commitments from the gift givers for monetary contributions toward a purchase price of a gift having the partial purchase option selected from the on-line display of gift ideas;
    combining the commitments for monetary contributions;
    automatically generating a purchase request for the selected gift if the total of the combined commitments is equal to or greater than the selected gift's purchase price; and
    attempting to satisfy the purchase request,
    wherein the commitment of each giver that commits to make a monetary contribution is for any giver-desired portion of the uncommitted balance of the selected gift's purchase price, and
    wherein attempting to satisfy the purchase request comprises:
    sending an offer to purchase the selected gift to a plurality of vendors;
    receiving an acceptance of the offer from one of the vendors; and
    requesting that the accepting vendor send the selected gift to the gift recipient.

12. A method for enabling a plurality of gift givers to each make a respective commitment for a monetary contribution of any giver-desired amount toward a gift for a gift recipient, the method comprising:
    receiving at a centralized gift registry computer system gift ideas supplied by the gift recipient;
    storing the gift ideas in a memory which is part of, or accessible to, said gift registry computer system;
    providing to the gift givers, based on the stored gift ideas and in response to requests supplied to said gift registry computer, an on-line display of the gift ideas, wherein the on-line display of the gift ideas reflects uncommitted balances of purchase prices for one or more of the gift ideas having a partial purchase option;
    receiving at said gift registry computer system commitments from the gift givers for monetary contributions toward a purchase price of a gift having the partial purchase option selected from the on-line display of gift ideas; combining the commitments for monetary contributions;
    automatically generating a purchase request for the selected gift if the total of the combined commitments is equal to or greater than the selected gift's purchase price; and
    attempting to satisfy the purchase request, wherein the commitment of each giver that commits to make a monetary contribution is for any giver-desired portion of the uncommitted balance of the selected gift's purchase price, and wherein attempting to satisfy the purchase request comprises:

adding the purchase request for the selected gift to a gift list of gifts to be purchased;

aggregating purchase requests for identical gifts into a single purchase order;

sending an offer to purchase the gifts in the purchase order to a plurality of vendors;

receiving an acceptance of the offer from one of the vendors; and requesting that the accepting vendor send the gifts in the purchase order to the appropriate gift recipients.

13. A computer-readable medium having computer-executable instructions for performing a method for enabling a plurality of gift givers to each make a respective commitment for a monetary contribution of any giver-desired amount toward a gift for a gift recipient, the method comprising:

receiving at a centralized gift registry computer system gift ideas supplied by the gift recipient;

storing the gift ideas in a memory which is part of, or accessible to, said gift registry computer system;

providing to the gift givers, based on the stored gift ideas and in response to requests supplied to said gift registry computer, an on-line display of the gift ideas, wherein the on-line display of the gift ideas reflects uncommitted balances of purchase prices for one or more of the gift ideas having a partial purchase option;

receiving at said gift registry computer system commitments from the gift givers for monetary contributions toward a purchase price of a gift having the partial purchase option selected from the on-line display of gift ideas;

combining the commitments for monetary contributions;

automatically generating a purchase request for the selected gift if the total of the combined commitments is equal to or greater than the selected gift's purchase price; and attempting to satisfy the purchase request, wherein the commitment of each giver that commits to make a monetary contribution is for any giver-desired portion of the uncommitted balance of the selected gift's purchase price.

14. A centralized gift registry computer system programmed to perform a method for enabling a plurality of gift givers to each make a respective commitment for a monetary contribution of any giver-desired amount toward a gift for a gift recipient, the method comprising:

receiving at said centralized gift registry computer system gift ideas supplied by the gift recipient;

storing the gift ideas in a memory which is part of, or accessible to, said gift registry computer system;

providing to the gift givers, based on the stored gift ideas and in response to requests supplied to said gift registry computer, an on-line display of the gift ideas, wherein the on-line display of the gift ideas reflects uncommitted balances of purchase prices for one or more of the gift ideas having a partial purchase option;

receiving at said gift registry computer system commitments from the gift givers for monetary contributions toward a purchase price of a gift having the partial purchase option selected from the on-line display of gift ideas;

combining the commitments for monetary contributions;

automatically generating a purchase request for the selected gift if the total of the combined commitments is equal to or greater than the selected gift's purchase price; and attempting to satisfy the purchase request, wherein the commitment of each giver that commits to make a monetary contribution is for any giver-desired portion of the uncommitted balance of the selected gift's purchase price.

15. A gift registry computer system configured to enable a plurality of gift givers to each make a respective monetary contribution of any giver-desired amount toward a gift for a gift recipient, the computer system comprising:

a communications circuit for connecting to a communications network;

a processor; and a memory containing instructions executable by said processor to perform the steps of:

receiving gift ideas supplied by the gift recipient via said communications network;

storing the gift ideas in said memory or in another memory accessible to said gift registry computer system;

providing to the gift givers, based on the stored gift ideas and in response to requests supplied via said communications network, an on-line display of the gift ideas, wherein the on-line display of the gift ideas reflects uncommitted balances of purchase prices for one or more of the gift ideas having a partial purchase option;

receiving, via said communications network, commitments from the gift givers for monetary contributions toward a purchase price of a gift having the purchase option selected from the display of gift ideas;

combining the commitments for monetary contributions;

automatically generating a purchase request for the selected gift if the total of the combined commitments is equal to or greater than the selected gift's purchase price; and attempting to satisfy the purchase request, wherein the commitment of each giver that commits to make a monetary contribution is for any giver-desired portion of the uncommitted balance of the selected gift's purchase price.

16. The gift registry computer system according to claim 15, wherein the communications network is the Internet.

17. The gift registry computer system according to claim 15, wherein the commitment of each giver that commits to make a monetary contribution is directly specified by the gift giver as an amount of currency.

18. A method for enabling a plurality of gift givers to each contribute part of a total gift amount specified for a gift for a gift recipient, the method comprising:

receiving at a centralized gift registry computer system gift ideas supplied by the gift recipient, at least one of the received gift ideas specifying a substitute gift;

storing the gift ideas in a memory which is part of, or accessible to, the gift registry computer system;

providing to the gift givers, based on the stored gift ideas and in response to requests supplied to the gift registry computer system, an on-line display of the gift ideas, wherein the on-line display of the gift ideas reflects uncommitted balances of total gift amounts for one or more gifts having a partial purchase option;

receiving at the gift registry computer system commitments from the gift givers for parts of the total gift amount specified for a gift having the partial purchase option selected from the on-line display of gift ideas;

combining the commitments from the gift givers; and automatically generating a purchase request for the selected gift if the total of the combined commitments is equal to or greater than the total gift amount specified for the gift, wherein the commitment of each giver for part of the total gift amount is directly specified by the gift giver as an amount of currency.

19. The method according to claim 18, wherein the providing of an on-line display of gift ideas comprises:

generating one or more web pages based on the gift ideas supplied by the gift recipient; and supplying the generated web pages to the gift givers in response to giver-supplied requests.

20. The method according to claim 18, wherein the receiving of commitments from the gift givers comprises:

receiving commitments from the gift givers that include commitments which are contingent upon other gift givers making commitments such that a final total of the combined commitments is equal to or greater than the total gift amount specified for the selected gift.

21. The method according to claim 18, further comprising:

providing the commitments from the gift givers to the gift recipient as cash if a final the total of the combined commitments is less than the total gift amount specified for the selected gift.

22. The method according to claim 18, wherein the gift recipient specifies total gift amounts for the gift ideas.

23. A storage medium having processor-executable instructions for performing a method for enabling a plurality of gift givers to each contribute part of a total gift amount specified for a gift for a gift recipient, the method comprising:

receiving at a centralized gift registry computer system gift ideas supplied by the gift recipient, at least one of the received gift ideas specifying a substitute gift;

storing the gift ideas in a memory which is part of, or accessible to, the gift registry computer system;

providing to the gift givers, based on the stored gift ideas and in response to requests supplied to the gift registry computer system, an on-line display of the gift ideas, wherein the on-line display of the gift ideas reflects uncommitted balances of total gift amounts for one or more of the gift ideas having a partial purchase option;

receiving at the gift registry computer system commitments from the gift givers for parts of the total gift amount specified for a gift having the partial purchase option selected from the on-line display of gift ideas;

combining the commitments from the gift givers; and automatically generating a purchase request for the selected gift if the total of the combined commitments is equal to or greater than the total gift amount specified for the gift, wherein the commitment of each giver for part of the total gift amount is directly specified by the gift giver as an amount of currency.

24. A computer system programmed to perform a method for enabling a plurality of gift givers to each contribute part of a total gift amount specified for a gift for a gift recipient, the method comprising:

receiving at a centralized gift registry computer system gift ideas supplied by the gift recipient, at least one of the received gift ideas specifying a substitute gift;

storing the gift ideas in a memory which is part of, or accessible to, the gift registry computer system;

providing to the gift givers, based on the stored gift ideas and in response to requests supplied to the gift registry computer system, an on-line display of the gift ideas, wherein the on-line display of the gift ideas reflects uncommitted balances of total gift amounts for one or more of the gift ideas having a partial purchase option;

receiving at the gift registry computer system commitments from the gift givers for parts of the total gift amount specified for a gift having the partial purchase option selected from the on-line display of gift ideas;

combining the commitments from the gift givers; and automatically generating a purchase request for the selected gift if the total of the combined commitments is equal to or greater than the total gift amount specified for the gift, wherein the commitment of each giver for part of the total gift amount is directly specified by the gift giver as an amount of currency.

25. A method for enabling a plurality of gift givers to each contribute part of a total gift amount specified for a gift for a gift recipient, the method comprising:

receiving at a centralized gift registry computer system gift ideas supplied by the gift recipient, wherein each gift idea has a specified total gift amount;

storing the gift ideas and total gift amounts in a storage medium which is part of, or accessible to, the gift registry computer system;

providing to the gift givers, based on the stored gift ideas and total gift amounts and in response to requests supplied to the gift registry computer system, an on-line display of the gift ideas, wherein the on-line display of the gift ideas reflects uncommitted balances of the specified total gift amounts for one or more of the gift ideas having a partial purchase option;

receiving at the gift registry computer system commitments from the gift givers for parts of the total gift amount specified for a gift having the partial purchase option selected from the on-line display of gift ideas;

combining the commitments from the gift givers; and automatically generating a purchase request for the selected gift if the total of the combined commitments is equal to or greater than the total gift amount specified for the selected gift, wherein each giver is able to commit for part of the total gift amount specified for the selected gift even if the only gift amount specified by the gift idea for the selected gift is the total gift amount.

26. The method according to claim 25, wherein the providing of an on-line display of gift ideas comprises:

generating one or more web pages based on the gift ideas supplied by the gift recipient; and supplying the generated web pages to the gift givers in response to giver-supplied requests.

27. The method according to claim 25, wherein the receiving of commitments from the gift givers comprises:

receiving commitments from the gift givers that include commitments which are contingent upon other gift givers making commitments such that a final total of the combined commitments is equal to or greater than the total gift amount specified for the selected gift.

28. The method according to claim 25, wherein the receiving of gift ideas from a gift recipient comprises receiving at least one gift idea that specifies a substitute gift.

29. The method according to claim 25, further comprising:
providing the commitments from the gift givers to the gift recipient as cash if a final total of the combined commitments is less than the total gift amount specified for the selected gift.

30. The method according to claim 25, wherein the gift recipient specifies the total gift amounts for the gift ideas.

31. A storage medium having processor-executable instructions for performing a method for enabling a plurality of gift givers to each contribute part of a total gift amount specified for a gift for a gift recipient, the method comprising:
receiving at a centralized gift registry computer system gift ideas supplied by the gift recipient, wherein each gift idea has a specified total gift amount;
storing the gift ideas and total gift amounts in a storage medium which is part of, or accessible to, the gift registry computer system;
providing to the gift givers, based on the stored gift ideas and total gift amounts and in response to requests supplied to the gift registry computer system, an on-line display of the gift ideas, wherein the on-line display of the gift ideas reflects uncommitted balances of the specified total gift amounts for one or more of the gift ideas having a partial purchase option;
receiving at the gift registry computer system commitments from the gift givers for parts of the total gift amount specified for a gift having the partial purchase option selected from the on-line display of gift ideas;
combining the commitments from the gift givers; and
automatically generating a purchase request for the selected gift if the total of the combined commitments is equal to or greater than the total gift amount specified for the selected gift,
wherein each giver is able to commit for part of the total gift amount specified for the selected gift even if the only gift amount specified by the gift idea for the selected gift is the total gift amount.

32. A computer programmed to perform a method for enabling a plurality of gift givers to each contribute part of a total gift amount specified for a gift for a gift recipient, the method comprising:
receiving at a centralized gift registry computer system gift ideas supplied by the gift recipient, wherein each gift idea has a specified total gift amount;
storing the gift ideas and total gift amounts in a storage medium which is part of, or accessible to, the gift registry computer system;
providing to the gift givers, based on the stored gift ideas and total gift amounts and in response to requests supplied to the gift registry computer system, an on-line display of the gift idea, wherein the on-line display of the gift ideas reflects uncommitted balances of the specified total gift amounts for one or more of the gift ideas having a partial purchase option;
receiving at the gift registry computer system commitments from the gift givers for parts of the total gift amount specified for a gift having the partial purchase option selected from the on-line display of gift ideas;
combining the commitments from the gift givers; and
automatically generating a purchase request for the selected gift if the total of the combined commitments is equal to or greater than the total gift amount specified for the selected gift,
wherein each giver is able to commit for part of the total gift amount specified for the selected gift even if the only gift amount specified by the gift idea for the selected gift is the total gift amount.

33. A gift registry computer system configured to enable a plurality of gift givers to each contribute part of a total gift amount specified for a gift for a gift recipient, the computer system comprising:
a communication circuit for connecting to a communications network;
a processor; and
a storage medium containing instructions executable by the processor to perform the steps of:
receiving gift ideas supplied by the gift recipient, at least one of the received gift ideas specifying a substitute gift;
storing the gift ideas in a storage medium which is accessible to the processor;
providing to the gift givers, based on the stored gift ideas and in response to requests supplied over the communications network, an on-line display of the gift ideas, wherein the on-line display of the gift ideas reflects uncommitted balances of total gift amounts for one or more of the gift ideas having a partial purchase option;
receiving commitments from the gift givers for parts of the total gift amount specified for a gift having the partial purchase option selected from the on-line display of gift ideas;
combining the commitments from the gift givers; and
automatically generating a purchase request for the selected gift if the total of the combined commitments is equal to or greater than the total gift amount specified for the gift,
wherein the commitment of each giver for part of the total gift amount is directly specified by the gift giver as an amount of currency.

34. The gift registry computer system according to claim 33, wherein the providing of an on-line display of gift ideas comprises:
generating one or more web pages based on the gift ideas supplied by the gift recipient; and
supplying the generated web pages to the gift givers in response to giver-supplied requests.

35. The gift registry computer system according to claim 33, wherein the receiving of commitments from the gift givers comprises:
receiving commitments from the gift givers that include commitments which are contingent upon other gift givers making commitments such that a final total of the combined commitments is equal to or greater than the total gift amount specified for the selected gift.

36. The gift registry computer system according to claim 33, further comprising:
providing the commitments from the gift givers to the gift recipient as cash if a final total of the combined commitments is less than the total gift amount specified for the selected gift.

37. The gift registry computer according to claim 33, wherein the gift recipient specifies the total gift amounts for the gift ideas.

38. A gift registry computer system configured to enable a plurality of gift givers to each contribute part of a total gift amount specified for a gift for a gift recipient, the computer system comprising:
  a communication circuit for connecting to a communications network;
  a processor; and
  a storage medium containing instructions executable by the processor to perform the steps of:
    receiving gift ideas supplied by the gift recipient, wherein each gift idea has a specified total gift amount;
    storing the gift ideas and total gift amounts in a storage medium which is accessible to the processor;
    providing to the gift givers, based on the stored gift ideas and total gift amounts and in response to requests supplied over the communications network, an on-line display of the gift ideas, wherein the on-line display of the gift ideas reflects uncommitted balances of the specified total gift amounts for one or more of the gift ideas having a partial purchase option;
    receiving commitments from the gift givers for parts of the total gift amount specified for a gift having the partial purchase option selected from the on-line display of gift ideas;
    combining the commitments from the gift givers and updating the display; and
    automatically generating a purchase request for the selected gift if the total of the combined commitments is equal to or greater than the total gift amount specified for the selected gift,
  wherein each giver is able to commit for part of the total gift amount specified for a selected gift even if the only gift amount specified by the gift idea for the selected gift is the total gift amount.

39. The gift registry computer system according to claim 38, wherein the providing of an on-line display of gift ideas comprises:
  generating one or more web pages based on the gift ideas supplied by the gift recipient; and
  supplying the generated web pages to the gift givers in response to giver-supplied requests.

40. The gift registry computer system according to claim 38, wherein the receiving of commitments from the gift givers comprises:
  receiving commitments from the gift givers that include commitments which are contingent upon other gift givers making commitments such that a final total of the combined commitments is equal to or greater than the total gift amount specified for the selected gift.

41. The gift registry computer system according to claim 38, wherein
  the receiving of gift ideas from a gift recipient comprises receiving at least one gift idea that specifies a substitute gift.

42. The gift registry computer system according to claim 38, further comprising:
  providing the commitments from the gift givers to the gift recipient as cash if a final total of the combined commitments is less than the total gift amount specified for the selected gift.

43. The gift registry computer system according to claim 38, wherein the gift recipient specifies the total gift amounts for the gift ideas.

44. A centralized gift registry computer system programmed to perform a method for enabling a plurality of gift givers to each make a respective commitment for a monetary contribution of any giver-desired amount toward a gift for a gift recipient, the method comprising:
  receiving at said centralized gift registry computer system gift ideas supplied by the gift recipient, each gift idea specifying gift parameters including one or more of a recipient-specified purchase price, a recipient-specified vendor and a recipient-specified substitute gift;
  storing the gift ideas in a memory which is part of, or accessible to, said gift registry computer system;
  providing to the gift givers, based on the stored gift ideas and in response to requests supplied to said gift registry computer, an on-line display of the gift ideas, wherein the on-line display of the gift ideas reflects uncommitted balances of the purchase prices for one or more of the gift ideas having a partial purchase option;
  receiving at said gift registry computer system commitments from the gift givers for monetary contributions toward the purchase price of a gift having the partial purchase option selected from the on-line display of gift ideas;
  combining the commitments for monetary contributions;
  automatically generating a purchase request for the selected gift if the total of the combined commitments is equal to or greater than the selected gift's purchase price; and
  attempting to satisfy the purchase request,
  wherein the amount of the monetary contribution of each commitment toward the uncommitted balance of the selected gift's purchase price is directly specified as an amount of currency which is not constrained by the gift parameters specified by the gift recipient for the selected gift.

45. The gift registry computer system according to claim 44, wherein the recipient-specified substitute gift is substituted for the selected gift if the purchase request for the selected gift cannot be satisfied.

46. The gift registry computer system according to claim 44, wherein the recipient-specified substitute gift is substituted for the selected gift if a final total of the combined commitments is less than the selected gift's purchase price.

47. The gift registry computer system according to claim 44, wherein the recipient-specified substitute gift is substituted for the selected gift if the purchase request for the selected gift cannot be satisfied to provide delivery by a certain time.

48. The gift registry computer system according to claim 44, wherein the recipient-specified substitute gift is substituted for the selected gift if the purchase request for the selected gift cannot be satisfied at the recipient-specified purchase price.

49. A method for enabling a plurality of gift givers to each make a respective commitment for a monetary contribution of any giver-desired amount toward a gift for a gift recipient, the method comprising:
  receiving at a centralized gift registry computer system gift ideas supplied by the gift recipient, each gift idea specifying gift parameters including one or more of a recipient-specified purchase price, a recipient-specified vendor and a recipient-specified substitute gift;
  storing the gift ideas in a memory which is part of, or accessible to, said gift registry computer system;
  providing to the gift givers, based on the stored gift ideas and in response to requests supplied to said gift registry computer, an on-line display of the gift ideas, wherein the on-line display of the gift ideas reflects uncommitted balances of the purchase prices for one or more of the gift ideas having a partial purchase option;

receiving at said gift registry computer system commitments from the gift givers for monetary contributions toward the purchase price of a gift having the partial purchase option selected from the on-line display of gift ideas;

combining the commitments for monetary contributions;

automatically generating a purchase request for the selected gift if the total of the combined commitments is equal to or greater than the selected gift's purchase price; and attempting to satisfy the purchase request, wherein the amount of the monetary contribution of each commitment toward the uncommitted balance of the selected gift's purchase price is directly specified as an amount of currency which is not constrained by the gift parameters specified by the gift recipient for the selected gift.

50. The method according to claim 49, wherein the recipient-specified substitute gift is substituted for the selected gift if the purchase request for the selected gift cannot be satisfied.

51. The method according to claim 49, wherein the recipient-specified substitute gift is substituted for the selected gift if a final total of the combined commitments is less than the selected gift's purchase price.

52. The method according to claim 49, wherein the recipient-specified substitute gift is substituted for the selected gift if the purchase request for the selected gift cannot be satisfied to provide delivery by a certain time.

53. The method according to claim 49, wherein the recipient-specified substitute gift is substituted for the selected gift if the purchase request for the selected gift cannot be satisfied at the recipient-specified purchase price.

54. A centralized gift registry computer system programmed to perform a method for enabling a plurality of gift givers to each make a respective commitment for a monetary contribution of any giver-desired amount toward a gift for a gift recipient, the method comprising:

receiving at said centralized gift registry computer system gift ideas supplied by the gift recipient, each gift idea specifying gift parameters including one or more of a recipient-specified purchase price, a recipient-specified vendor and a recipient-specified substitute gift;

storing the gift ideas in a memory which is part of, or accessible to, said gift registry computer system;

providing to the gift givers, based on the stored gift ideas and in response to requests supplied to said gift registry computer, an on-line display of the gift ideas, wherein the on-line display of the gift ideas reflects uncommitted balances of the purchase prices for one or more of the gift ideas having a partial purchase option;

receiving at said gift registry computer system commitments from the gift givers for monetary contributions toward the purchase price of a gift having the partial purchase option selected from the on-line display of gift ideas;

combining the commitments for monetary contributions;

automatically generating a purchase request for the selected gift if the total of the combined commitments is equal to or greater than the selected gift's purchase price; and attempting to satisfy the purchase request, wherein the recipient-specified substitute gift is substituted for the selected gift if the purchase request for the selected gift cannot be satisfied.

55. A method for enabling a plurality of gift givers to each make a respective commitment for a monetary contribution of any giver-desired amount toward a gift for a gift recipient, the method comprising:

receiving at a centralized gift registry computer system gift ideas supplied by the gift recipient, each gift idea specifying gift parameters including one or more of a recipient-specified purchase price, a recipient-specified vendor and a recipient-specified substitute gift;

storing the gift ideas in a memory which is part of, or accessible to, said gift registry computer system;

providing to the gift givers, based on the stored gift ideas and in response to requests supplied to said gift registry computer, an on-line display of the gift ideas, wherein the on-line display of the gift ideas reflects uncommitted balances of the purchase prices of one or more of the gift ideas having a partial purchase option;

receiving at said gift registry computer system commitments from the gift givers for monetary contributions toward the purchase price of a gift having the partial purchase option selected from the on-line display of gift ideas;

combining the commitments for monetary contributions;

automatically generating a purchase request for the selected gift if the total of the combined commitments is equal to or greater than the selected gift's purchase price; and attempting to satisfy the purchase request, wherein the recipient-specified substitute gift is substituted for the selected gift if the purchase request for the selected gift cannot be satisfied.

* * * * *